United States Patent [19]

Bessler et al.

[11] Patent Number: 4,709,394
[45] Date of Patent: Nov. 24, 1987

[54] MULTIPLEXED REAL-TIME PYRAMID SIGNAL PROCESSING SYSTEM

[75] Inventors: Roger F. Bessler; James H. Arbeiter; Joseph O. Sinniger, all of Mercer County, N.J.

[73] Assignee: RCA Corporation, Princeton, N.J.

[21] Appl. No.: 768,809

[22] Filed: Aug. 23, 1985

[51] Int. Cl.$^4$ .............................................. G06K 9/54
[52] U.S. Cl. .......................................... 382/49; 382/41; 382/42; 382/43; 358/133; 364/723; 364/724; 364/725; 364/728
[58] Field of Search ............... 364/723, 724, 725, 728; 358/11, 133, 140; 382/41, 42, 43, 49

[56] References Cited

U.S. PATENT DOCUMENTS

| | | | |
|---|---|---|---|
| 4,447,886 | 5/1984 | Meeker | 364/725 |
| 4,603,350 | 7/1986 | Arbeiter et al. | 358/140 |
| 4,674,125 | 6/1987 | Carlson et al. | 382/49 |
| 4,694,413 | 9/1987 | Arbeiter | 364/724 |

OTHER PUBLICATIONS

C. Rochiere et al., *Multirate Digital Signal Processing*, published by Prentice Hall, Inc., 1983, pp. 79–88.

U.S. patent application Ser. No. 596,817, filed Apr. 4, 1984 by Carlson et al.

U.S. patent application Ser. No. 632,467, filed Jul. 19, 1984 by Arbeiter.

*Primary Examiner*—Leo H. Boudreau
*Assistant Examiner*—Jose L. Couso
*Attorney, Agent, or Firm*—Allen LeRoy Limberg; George J. Seligsohn

[57] ABSTRACT

The amount of hardware required to implement a Burt Pyramid or an FSD (filter-subtract-decimate) pyramid analyzer (or synthesizer) stage of a sampled temporal signal representing an n-dimensional information component or (such as a video signal) is substantially reduced by employing a time-synchronized multiplexed analyzer stage to derive (or a time-synchronized multiplexed synthesizer stage that is responsive to) a single serial stream of samples of a predetermined plural number of sub-spectra that are arranged in a predetermined temporal order format with respect to one another in accordance with each of a given set of time synchronized, repetitively generated, serially applied control signals.

17 Claims, 16 Drawing Figures

MULTIPLEXED REAL-TIME PYRAMID SIGNAL PROCESSING SYSTEM

BACKGROUND OF THE INVENTION

I. Field of the Invention

This invention relates to a signal processing system employing real-time hierarchial pyramid signal processing techniques for analyzing and/or synthesizing a sampled temporal signal which defines an information component having one or more dimensions. More particularly, the signal processing system of the present invention employs multiplexing to substantially reduce the amount of hardware required to implement such a signal processing system.

II. Description of the Prior Art

U.S. Pat. No. 4,674,125 issued June 16, 1987 to C. R. Carlson, J. H. Arbeiter, and R. F. Bessler; assigned to RCA Corporation; and entitled "Real-Time Hierarchal Pyramid Signal Processing Apparatus" discloses real-time hierarchal pyramid signal processing apparatus which employs pipe-line architecture for analyzing, in delayed real time, the frequency spectrum of an n-dimensional (where n is a given integer having a value of at least one) information component defined by a sampled temporal signal (such as the two-dimensional spatial frequency spectrum of a television image defined by a sampled video signal); and for synthesizing, in delayed real time, such a sampled temporal signal from the analyzed frequency spectrum thereof. In particular, the signal processing apparatus disclosed in the Carlson et al. patent is capable of implementing hierarchial pyramid algorithms, such as one developed by Dr. Peter J. Burt (hereinafter referred to as the "Burt Pyramid") by means which include a relatively large number of stages. Each stage includes a digital convolution filter-decimator and expander-interpolation filter, each of which operates on a stream of signal samples. As disclosed in this Carlson et al. patent, the total amount of hardware required for the structure of all of these stages is quite large and, hence, relatively expensive.

Reference is made to co-pending U.S. application Ser. No. 632,467, filed July 19, 1984, by Arbeiter and issued Sept. 15, 1987, as U.S. Pat. No. 4,694,413 entitled "Compact Structure Input-Weighted Multitap Digital Filers", which discloses filter structure that significantly recuces the amount of hardware required to implement each stage. However, this application does not disclose a technique for reducing the number of separate stages of the device required to implement that pyramid analyzer and/or synthesizer.

Reference is further made to pages 79–88 of the book *Multirate Digital Signal Processing*, by C. Rochiere et al., published by Prentice Hall, Inc., in 1983, which discusses the use of polyphase component filters for decimation and interpolation with integer changes in sampling rate.

SUMMARY OF THE INVENTION

The present invention is directed to a multiplexing technique that permits a single stage of hardware to perform all the functions previously performed by a plurality of stages of a pyramid analyzer or a pyramid synthesizer. More specifically, the present invention is directed to a time-synchronized system for converting in delayed real time a first sampled temporal signal into a second sampled temporal signal. The samples comprising a certain one of said first and second signals define an n-dimensional information component, where n is a given integer having a value of at least one. The samples comprising the other one of said first and second signals define each one of a given plural number of separate frequency sub-spectra of the frequency spectrum of the n-dimensional information component. Each of the sub-spectra below the highest-frequency one of the sub-spectra has a sample density which is a certain sub-multiple of the sample density of its next-higher-frequency one of the subspectra. Further, the respective samples of each of the sub-spectra occur temporally at a sample rate which is directly proportional to its sample density. The time-synchronized system comprises a multiplexed stage including sampled-signal processing means, multiplexing means, and means for repetitively generating a given set of time-synchronized control signals that are serially applied to the multiplexing means. The sampled-signal processing means has at least one input and at least one output, and exhibits predetermined processing characteristics. The multiplexing means selectively applies said first signal to at least one input of the processing means in accordance with each of the given set of time-synchronized control signals serially applied thereto. Further, the predetermined processing characteristics exhibited by the processing means are such as to derive said second signal as an output of said multiplexed stage after a number of repetitive generations of the set of control signals having a value that is a linear function of the given number of subspectra.

BRIEF DESCRIPTION OF THE DRAWING

FIG. 5a is a timing diagram illustrating a preferred format of time-multiplexed samples generated by the FIG. 2 embodiment of the present invention, which may be employed for an information component having only one dimension;

FIG. 5b is a timing diagram illustrating a first preferred format of time-multiplexed samples generated by the FIG. 3 or 4 embodiment of the present invention, which may be employed for an information component having only one dimension;

PREFERRED EMBODIMENTS

Figure 1:
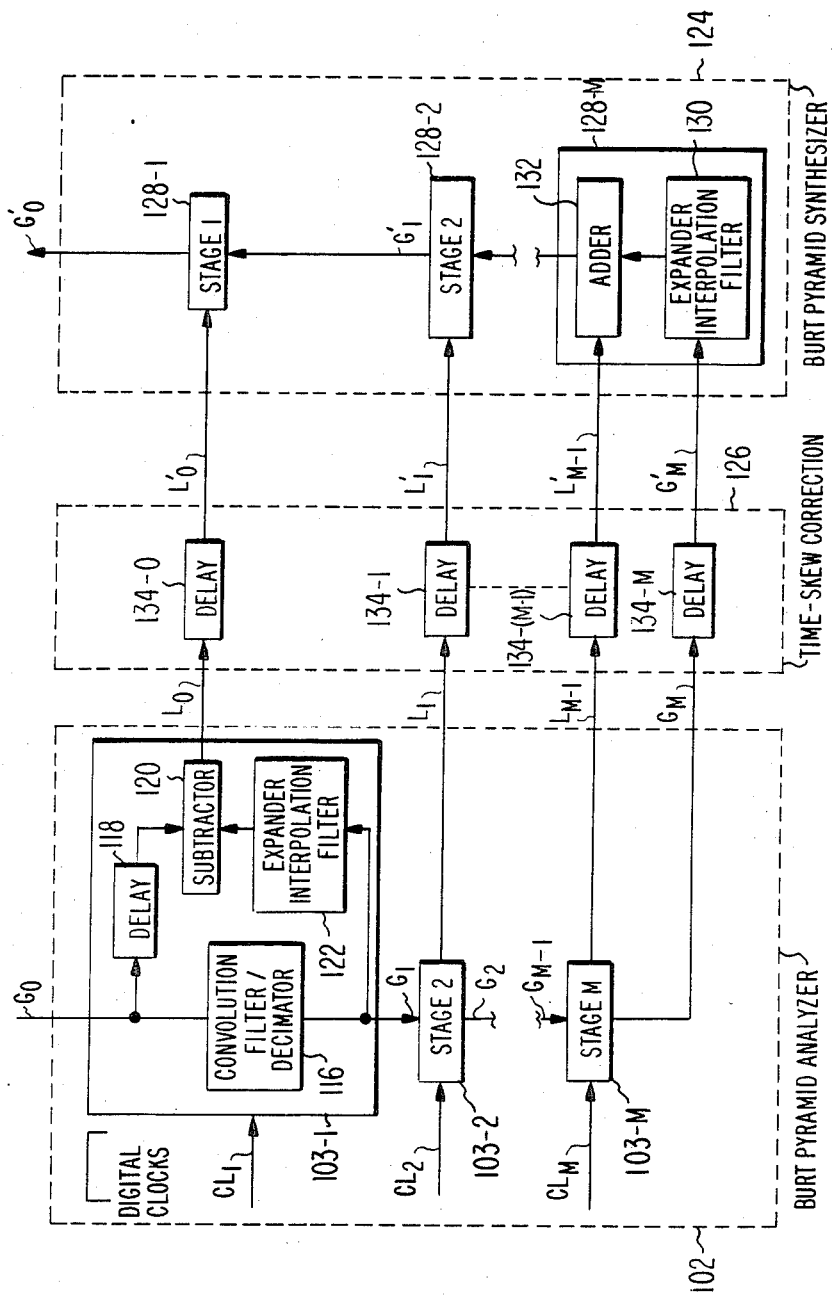
FIGS. 1, 1a and 1b illustrate three respective prior-art implementations of a real-time pyramid signal processing system.

Referring to FIG. 1, Burt Pyramid analyzer 102 (described in detail in the aforesaid Carlson et al. patent) is comprised of a pipeline of M generally similar sampled-signal translation stages 103-1, 103-2 ... 103-M. Each of the respective stages operates at a sample rate determined by the frequency of the digital clock signals $CL_1$, $CL_2$ ... $CL_M$ individually applied thereto. The frequency of the clock applied to any particular one of the stages is lower than the frequency of the clock applied to any stage that precedes it. Preferably, the frequency of each of the clocks of stages 103-2 ... 103-M is a sub-multiple (e.g. one-half) of the clock of the immediately preceding stage. In the following description it will be assumed that this preferable relationship among the clocks $CL_1$ ... $CL_M$ is the case.

As indicated in FIG. 1, stage 103-1 is comprised of convolution filter/decimator 116, delay means 118, subtractor 120 and expander/interpolation filter 122. An input stream of digital samples $G_0$ having a sample rate equal to the frequency of clock signal $CL_1$ is applied through convolution filter/decimator 116 to derive an output stream of digital samples $G_1$ at a sample rate equal to the frequency of clock signal $CL_2$. $G_0$ is a sampled temporal signal, such as a video signal, that may represent a scanned 2-D image, such as a television image. The level of each sample is usually digitally represented by a multibit (e.g. 8-bit) number. The convolution filter has a low pass function that reduces the center spatial frequency of each image dimension represented by $G_1$ to one-half of the center-spatial frequency of the corresponding dimension represented by $G_0$. At the same time, the decimator reduces the sample density in each dimension by one-half.

The respective digital samples of $G_0$ are applied through delay means 118 as a first input to subtractor 120. At the same time, the reduced-density digital samples of $G_1$ are applied to expander/interpolation filter 122, which increases the sample density of the $G_1$ samples back to that of $G_0$. Then, the expanded density interpolated $G_1$ samples are applied as a second input to subtractor 120. The presence of delay means 118 ensures that each pair of samples of $G_0$ and $G_1$, which correspond with one another in spatial position, are applied to the first and second inputs of subtractor 120 in time coincidence with one another. The output stream of successive samples $L_0$ from subtractor 120 defines the highest spatial frequency octave in each dimension of the scanned image.

The structure of each stages 103-2 ... 103-M is essentially the same as that of stage 103-1. However, each of the higher ordinal numbered stages 103-2 ... 103-M operates on lower spatial frequency signals occurring at lower sample densities than its immediately preceding stage. More specifically, the output stream of successive samples $L_1$ represents the next-to-highest octave of spatial frequencies in each image dimension, etc., so that, as indicated in FIG. 1, the Burt Pyramid analyzed signal is comprised of respective octave sample streams $L_0$ ... $L_{M-1}$ (derived respectively from the subtractor of each of stages 103-1 ... 103-M) together with a low-frequency remnant signal $G_M$ (derived from the output of the convolution filter/decimator of stage 103-M).

The corresponding pixel samples of the respective outputs of $L_0$ ... $L_{M-1}$ and $G_M$ of stages 103-1 ... 103-M of analyzer 102 do not occur in time coincidence with one another due to intrinsic time delays inserted by the various convolution filter/decimators and expander/interpolation filters of stages 103-1 ... 103-M.

As indicated in FIG. 1, outputs $L_0$ ... $L_{M-1}$ and $G_M$ from Burt Pyramid analyzer 102 are forwarded as inputs to Burt Pyramid synthesizer 124 through time-skew correction means 126. In practice, one or more of output signals $L_0$ ... $L_{M-1}$ and $G_M$ may be altered or modified by alteration means, not shown, before being forwarded to synthesizer 124. However, in any case, after any alteration and time-skew correction, each of respective signals $L'_0$ ... $L'_{M-1}$ and $G'_M$ is applied as an input to stages 128-1 ... 128-M of synthesizer 124.

The signal $G'_0$, corresponding to the original signal $G_0$ applied to Burt Pyramid analyzer 102, is synthesized by synthesizer 124 operating on the pixel sample streams $L'_0$ ... $L'_{M-1}$ and $G'_M$. This is accomplished by applying the remnant sample stream $G'_M$, which occurs at the lowest sample density, as an input to expander/interpolation filter 130, which doubles the input sampling density of $G'_M$ in each of the image spatial dimensions represented thereby. Corresponding pixel samples at the output of expander/interpolation filter 130 and of the sample stream $L'_{M-1}$ (which corresponding pixel samples must occur in time coincidence with one another) are summed in adder 132. By iteration of this process through successive synthesis stages 128-(M-1) ... 128-1 (each of which also includes an expander/interpolation filter followed by an adder), the synthesizer output sample stream $G'_0$, defining the synthesized two-dimensional image at the original high sample density of $G_0$, is derived.

The respective expander/interpolation filters of each of the synthesizer stages 128-M ... 128-1 intrinsically inserts a time delay. These time delays are cumulative. However, it is essential that corresponding pixel samples at the two inputs at the respective adders of each of the synthesizer stages 128-M ... 128-1 occur in time coincidence with one another. Thus, while intrinsic time delays cause each pixel sample appearing at $L_0$ output from analyzer 102 to occur significantly earlier than the corresponding pixel sample appearing at the $G_M$ output from analyzer 102, in order to compensate for the intrinsic time delays in the synthesizer it is necessary that each pixel sample appearing at the $G'_M$ input to synthesizer 124 occurs significantly earlier than the corresponding pixel sample appearing at the $L'_0$ input to synthesizer 124. Therefore, while any time delay inserted by delay means 134-M of time-skew correction means 126 is relatively small (even zero in some cases), the time delay inserted by delay means 134-0 of time-skew correction means 126 is relatively large—often being nearly a scanning-field time duration in length.

A primary advantage of the Burt Pyramid, discussed in more detail in the aforesaid Carlson et al. patent, is that it permits a reconstituted image synthesized from the respective analyzed outputs $L_0$ ... $L_{M-1}$ and $G_M$ to be derived in a manner such that the introduction of noticeable artifacts into the image processing due to image processing is minimized. A disadvantage of a Burt Pyramid is that it requires an expander and interpolation filter (in addition to a convolution filter and decimator) per analyzer stage, and this increases both its cost and complexity.

Figure 1A:
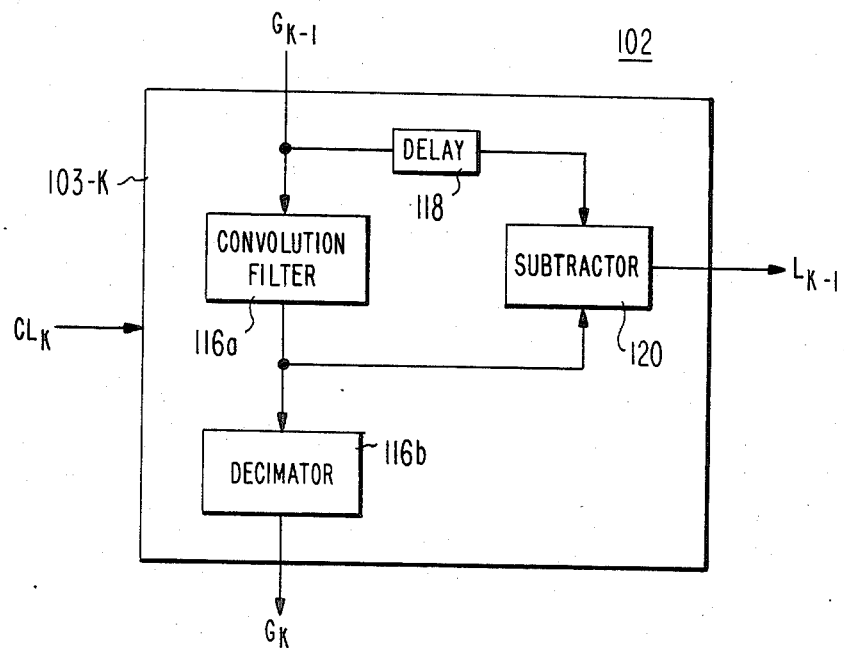

An alternative hierarchial pyramid analyzer, known as a filter-subtract-decimate (FSD) pyramid analyzer is also described in the aforesaid Carlson et al. patent. The FSD pyramid analyzer, shown in FIG. 1a, is similar to the Burt Pyramid analyzer in several ways. First, the FSD analyzer is also comprised of a pipeline of generally similar sampled-signal translation means 103-1, 103-2 . . . 103-M. Second, each of the respective stages operates at a sample rate determined by the frequency of the digital clock signals $CL_1$, $CL_2$ . . . $CL_M$ individually applied thereto. Third, the frequency of the clock signal applied to any particular one of the stages is preferably a sub-multiple of that of the clock of the immediately preceding stage.

However, the specific structural arrangement comprising each of the stages of the FSD pyramid analyzer differs somewhat from the structural arrangement comprising each stage (such as stage 103-1 of FIG. 1) of the Burt Pyramid analyzer. More specifically, each stage 103-K (where K has any value between 1 and M) of the FSD pyramid analyzer shown in FIG. 1a is comprised of convolution filter 116a, decimator 116b, delay means 118 and subtractor 120. Synthesizer 124 of FIG. 1 may be employed without modification for use with an FSD pyramid.

The output from convolution filter 116a, (before decimation by decimator 116b) is applied as an input to subtractor 106. This structural configuration eliminates the need for providing an expander and interpolation filter in each stage of an FSD pyramid analyzer. The elimination of expander and interpolation filters significantly reduces both the cost and the amount of inherent delay of each stage of the FSD pyramid analyzer shown in FIG. 1a, compared to that of each stage of the Burt Pyramid analyzer shown in FIG. 1.

Figure 1B:
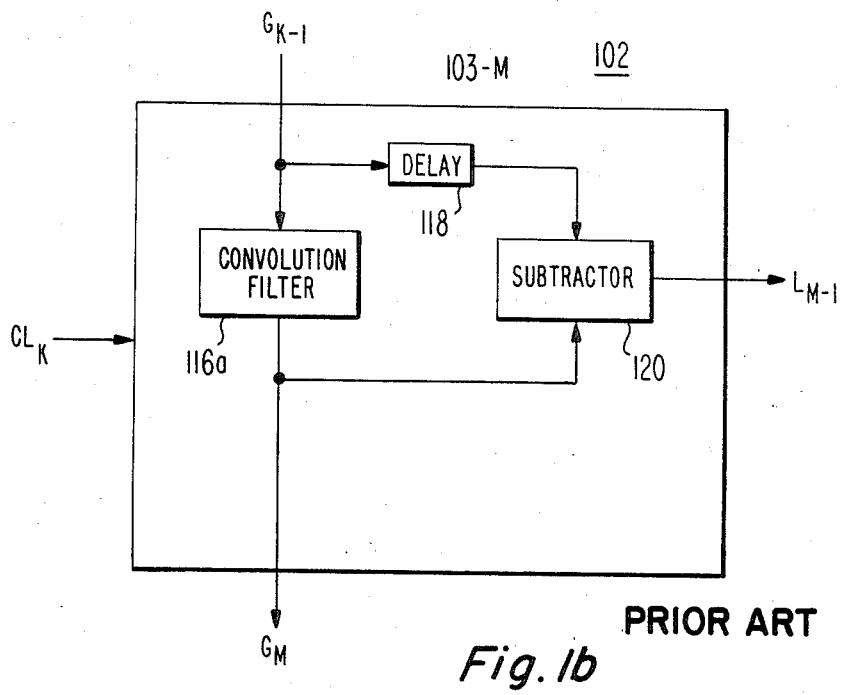

The aforesaid Carlson et al. patent brings out the fact that it is permissible, but not essential, that the final stage of a pyramid analyzer include a decimator. As indicated in FIG. 1b, the $G_M$ output of final stage 103-M of either a Burt Pyramid analyzer or an FSD analyzer may be obtained directly at the output of convolution filter 116a (rather than through a decimator as in FIGS. 1 and 1a) Therefore, FIG. 1b (which is identical in structure to FIG. 1a in all other respects) derives its $G_M$ output at the same sample density as its $L_{M-1}$ output, rather than at a sub-multiple thereof. Therefore, in this case, it is necessary to modify synthesizer 124 of FIG. 1 to the extent of omitting an expander/interpolation filter only from the final stage 128-M of the synthesizer.

The present invention is based on the fact that the total number of samples contained in $L_1+L_2+\ldots L_{M-1}+G_M$ can never be greater than the number of samples contained in $L_0$, regardless of how large the value of M is. Specifically, in the one-dimensional case (which is the worst case), the number of samples contained in $L_1+L_2\ldots +L_{M-1}+G_M$ would be equal to the number of samples contained in $L_0$ only if M were infinately large. Since M always has a finite value, the total number of samples contained in $L_1+L_2\ldots +L_{M-1}+G_M$ is always smaller than the number of samples contained in $L_0$. In more quantitative terms, the number of samples contained in $L_1+L_2\ldots +L_{M-1}+G_M$ is always smaller than $L_0(2^n-1)^1$, where n is the number of dimensions of the information component defined by a sampled temporal signal.

Figure 2:
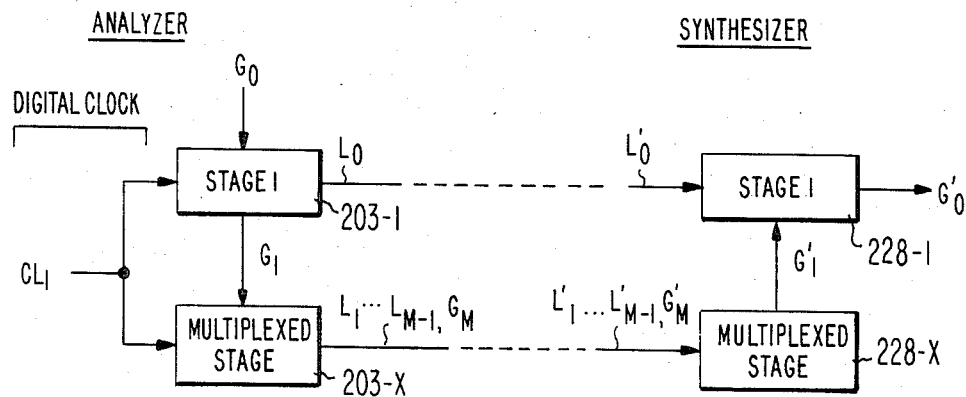
FIGS. 2, 3 and 4 illustrate three respective embodiments of a multiplexed real-time pyramid signal processing system incorporating the present invention.
Figure 3:
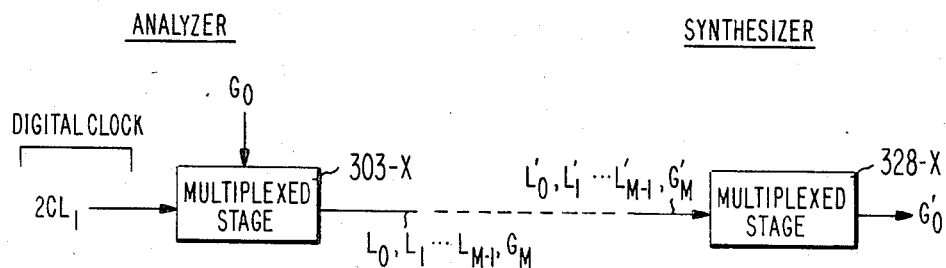
Figure 4:
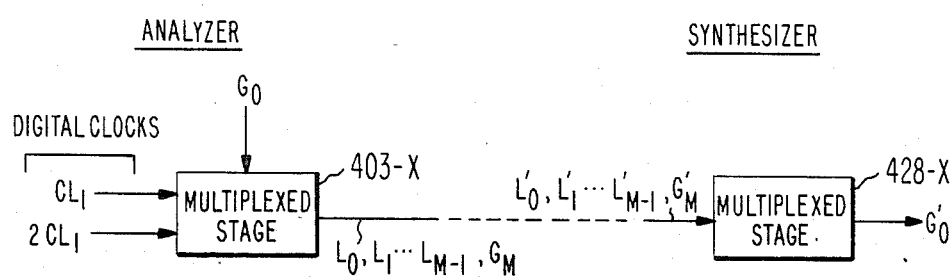

Reference is now made to each of FIGS. 2, 3 and 4, which illustrate three respective embodiments of a multiplexed real-time pyramid signal processing system incorporating the present invention. Each of the three embodiments includes an analyzer that is functionally similar to the analyzers shown in FIGS. 1, 1a and/or 1b, and a synthesizer which is functionally similar to the synthesizer shown in FIG. 1.

The analyzer of the FIG. 2 embodiment includes a first stage 203-1 and a multiplexed stage 203-X. First stage 203-1 is structurally and functionally identical to either the first stage 103-1 of the Burt Pyramid analyzer shown in FIG. 1 or the FSD analyzer shown in FIG. 1a. Multiplexed stage 203-X (which performs the function of all of stages 2 to M of either the Burt Pyramid Analyzer or FSD analyzer shown respectively in FIGS. 1 and 1a) may have the structure shown in FIGS. 6 or 8, by way of example, described in detail below.

First stage 203-1, operating at a clock rate $CL_1$ equal to the sample rate of the $G_0$ input signal applied thereto, derives a serial stream of $L_0$ samples at the clock rate $CL_1$ and also derives a $G_1$ serial stream of samples at a sample rate which is a certain sub-multiple, as in the prior art, of the clock rate $CL_1$. The $G_1$ output from first stage 203-1 is applied as an input signal to multiplexed stage 203-X. Multiplexed stage 203-X, operating at the $CL_1$ clock rate, derives as an output a single serial stream of samples corresponding to $L_1, L_2 \ldots L_{M-1}$ and $G_M$ at a sample rate equal to $CL_1$.

The synthesizer of the FIG. 2 embodiment includes first stage 228-1 and multiplexed stage 228-X. First stage 228-1 is similar in structure and function to first stage 128-1 of the synthesizer shown in FIG. 1. Multiplexed stage 228-X (which performs the function of all of stages 128-2 . . . 128-M of the synthesizer shown in FIG. 1) may have the structure shown in FIG. 10 described in detail below. Multiplexed stage 228-X of the synthesizer processes a single stream of samples comprising $L'_1, L'_2 \ldots L'_{M-1}$ and $G'M$, applied as an input thereto, into an output stream of samples $G'_1$. The output sample stream $G'_1$ for multiplexed stage 228-X, which is applied as an input to first stage 228-1 of the synthesizer, occurs at the same certain sub-multiple of $CL_I$ as does the $G_1$ output from first stage 203-1 of the analyzer applied as an input to multiplexed stage 203-X of the analyzer. First stage 228-1 of the synthesizer expands the sample rate of the $G'_1$ input thereto to the $CL_1$ sample rate of the $L'_0$ input to first synthesizer stage 228-1, after which the expanded $G'_1$ samples are added to the corresponding $L'_0$ samples to provide the $G'_0$ output from first synthesizer stage 228-1 at a sample rate equal to $CL_1$.

Figure 6:
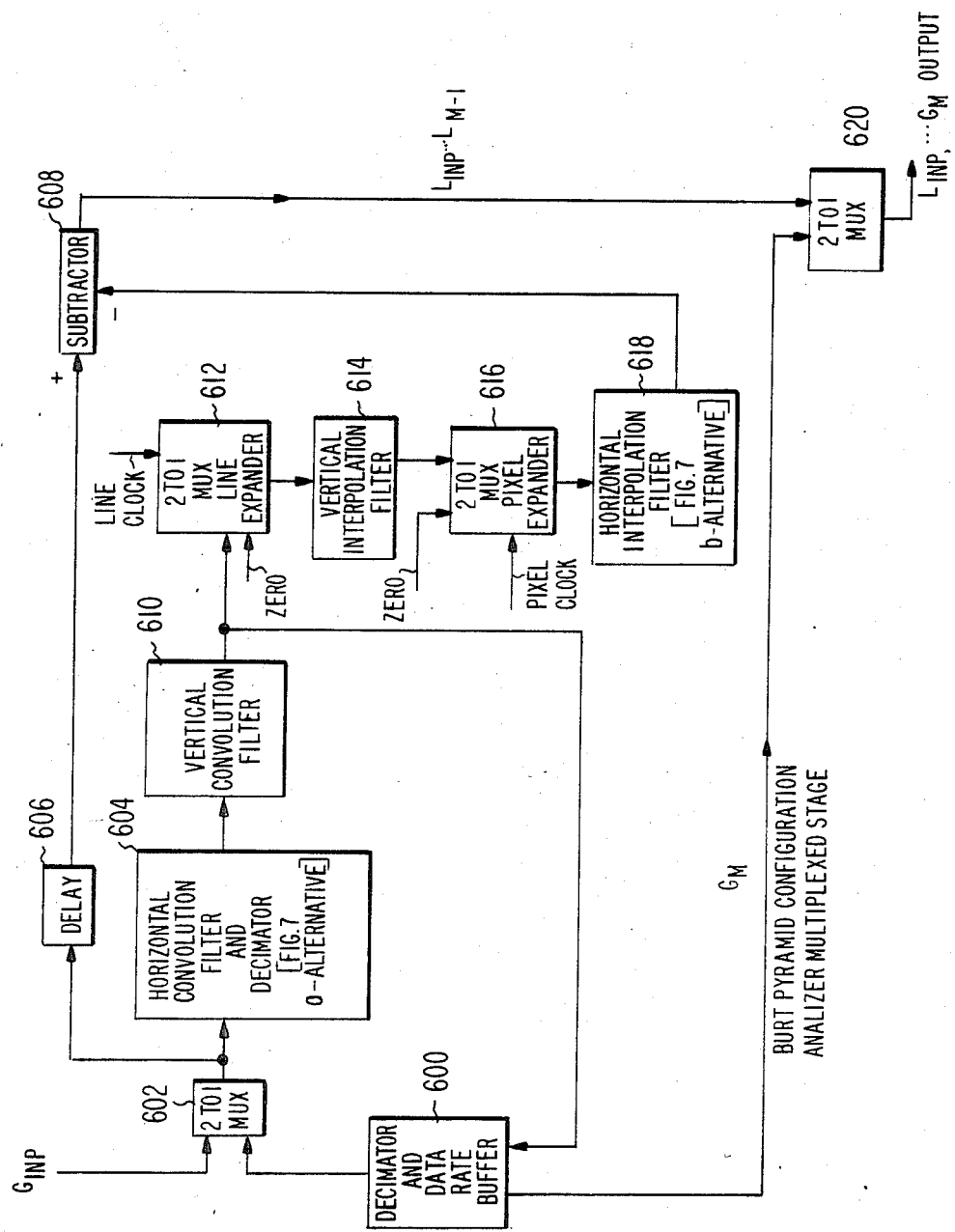
FIG. 6 is a block diagram of a structural configuration of a multiplexed stage of the analyzer of FIGS. 2 or 3 that operates as a Burt Pyramid analyzer.
Figure 8:
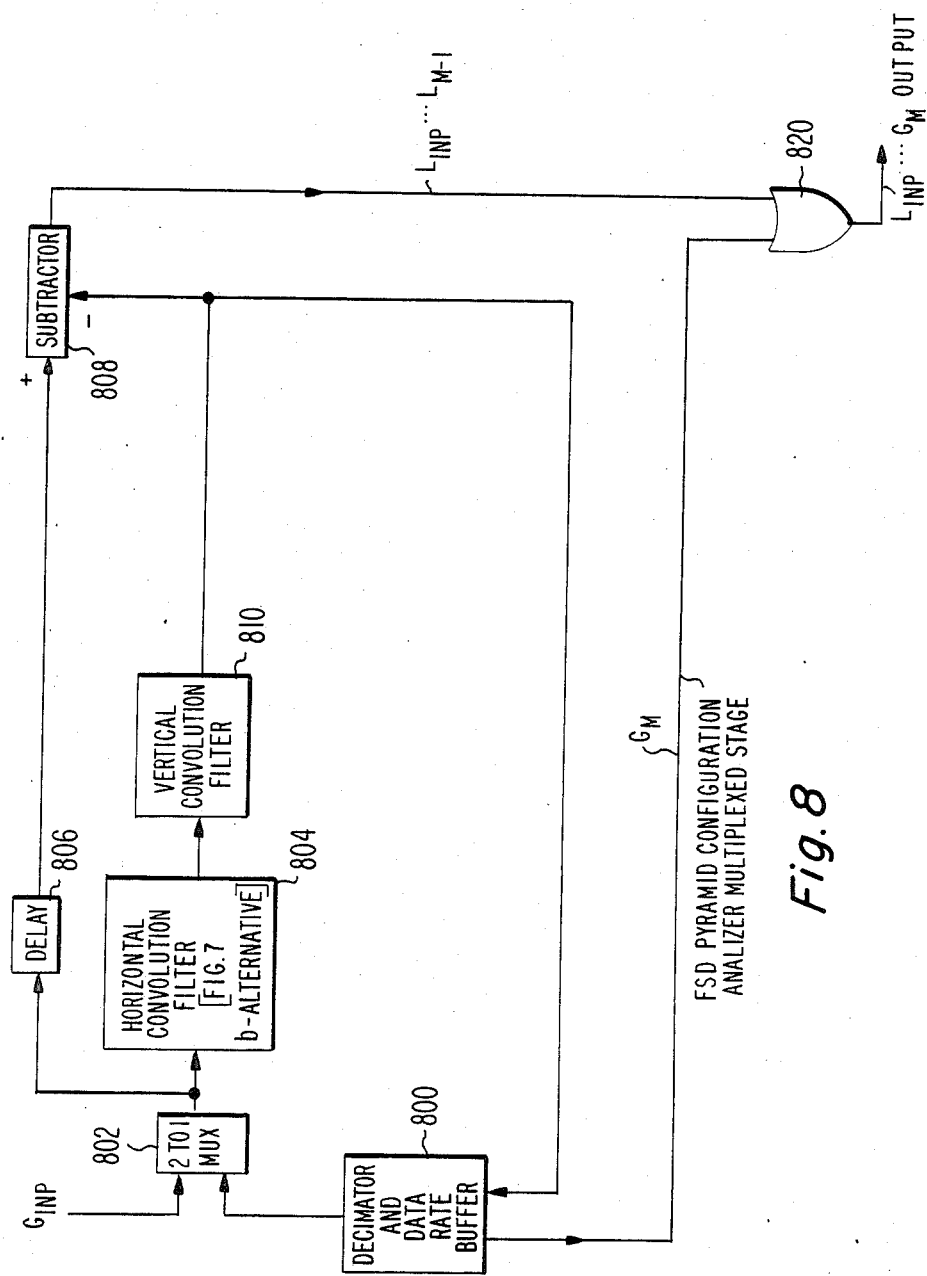
FIG. 8 is a block diagram of a structural configuration of the multiplexed stage of the analyzer of FIG. 2 or FIG. 3, which operates as a filter-subtract-decimate (FSD) pyramid analyzer.
Figure 10:
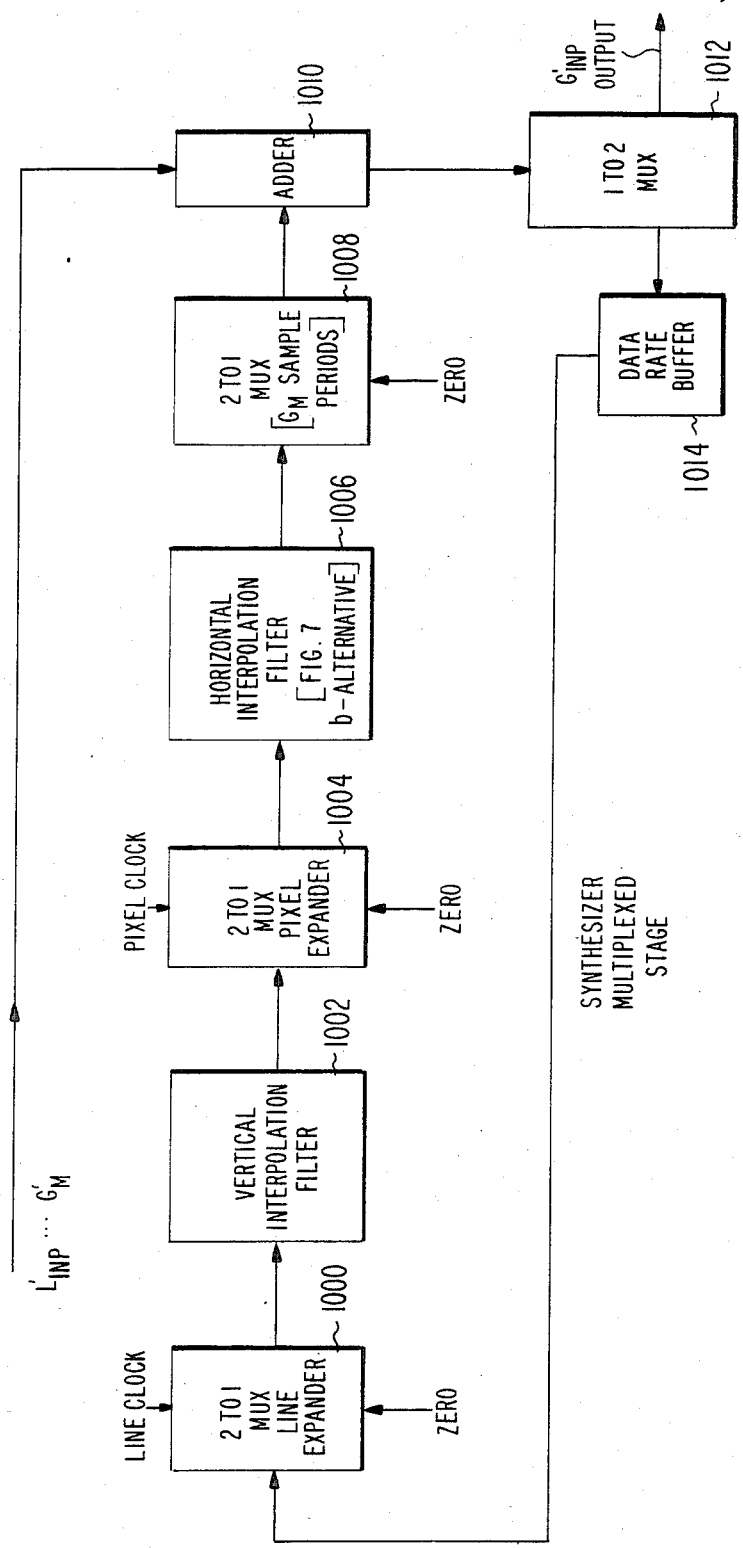
FIG. 10 is a block diagram illustrating a structural embodiment of the multiplexed stage of the synthesizer of FIGS. 2, 3 or 4.

The FIG. 3 embodiment does away with the need for the first stage of the analyzer, at the cost of operating analyzer multiplexed stage 303-X and synthesizer multiplexed stage 328-X at a clock rate $2CL_1$ (i.e., twice the average sample rate of the input temporal signal $G_0$). As described in more detail below, analyzer multiplexed stage 303-X may be implemented in somewhat different forms. In a first implementation form, successive samples of the $G_0$ temporal input signal occur during every other one of the successive $2CL_1$ clock periods, and successive samples of the single serial output stream (which is comprised of $L_0, L_1 \ldots L_{M-1}$ and $G_M$ samples) occur during each of the remaining $2CL_1$ clock periods. The preferred implementations of multiplexed stage 303-X, operating respectively as a Burt Pyramid analyzer or as an FSD analyzer, are shown in FIGS. 6 and 8. FIG. 10, described below, shows a preferred implementation of synthesizer multiplexed stage 328-X, which derives an output signal $G'_0$ in response to a single stream of samples (comprised of $L'_0, L'_1 \ldots L'_{M-1}$ and $G'_M$) being applied as an input thereto.

The FIG. 4 embodiment is similar to the FIG. 3 embodiment to the extent that it employs a single multiplexed stage 403-X to analyze the sampled temporal input signal $G_0$ into a single serial stream of samples comprised of $L_0, L_1 \ldots L_{M-1}$, and $G_M$. However, as shown in more detail in FIGS. 9a and 9b described below, the horizontal convolution filter/decimator of analyzer multiplexed stage 403-X may operate at the relatively low $CL_1$ clock rate $L_1$ (rather than at the relatively high $2CL_1$ clock rate of the multiplexed stage 303-X). This permits some additional elements of analyzer multiplexed stage 403-X also to operate at the relatively low $CL_1$ clock rate. In other respects, analyzer multiplexed stage 403-X is similar to analyzer multiplexed stage 303-X. Further, synthesizer multiplexed stage 428-X is similar to synthesizer multiplexed stage 328-X.

Figures 5A, 5B:
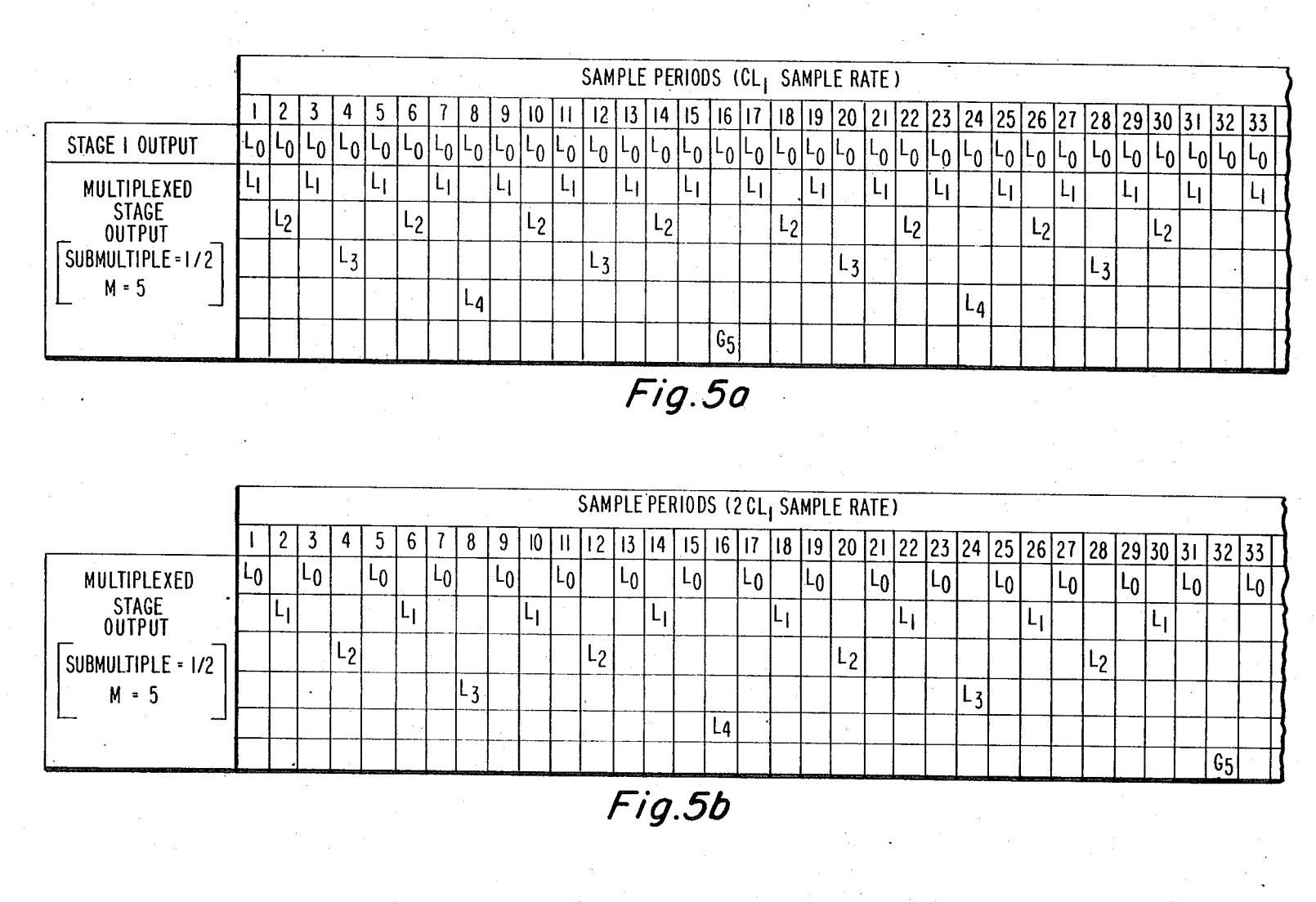

Referring to FIG. 5a, there is shown a preferred format for the respective outputs of stages 203-1 and 203-X for a one-dimensional information component (the worst case) of the sampled temporal signal input $G_0$, assuming for illustrative purposes that the value of the certain submultiple is one-half and the value of M is 5. As indicated in FIG. 5a, the respective samples of the $L_0$ output from analyzer first stage 203-1 occur during each and every one of successive sample periods (the sample periods occurring at a sample rate equal to the $CL_1$ clock frequency). Because the sample density of $L_1$ is one-half that of $L_0$, the sample density of $L_2$ is one-half of that of $L_1$, etc., all these samples, which comprise the serial stream output from analyzer multiplexed stage 203-X can be accommodated. Specifically, in the desirable format shown in FIG. 5a, 35 each of the odd sample periods is occupied by an $L_1$ sample, while the $L_2$, $L_3$, $L_4$ and $G_5$ samples occupy the even sample periods. In particular, sample periods 1, 3, 5 . . . are occupied by $L_1$, sample periods 2, 6, 10, 14. . . . are occupied by $L_2$ samples, sample periods 4, 12, 20 . . . are occupied by $L_3$ samples, sample periods 8, 24, 40 . . . are occupied by $L_4$ samples, and sample periods 16, 48, 80 . . . are occupied by $G_5$ samples.

Since M is assumed to be equal to 5 in FIG. 5a, the first thirty-one sample periods of each set of 32 (i.e., $2^5$) successive sample periods is occupied by an $L_1$, $L_2$, $L_3$, $L_4$ or a $G_5$ sample. However, the 32nd sample period of each set of 32 successive sample periods of the serial stream output from analyzer multiplexed stage 203-X is not occupied by any sample. This is because the sample density of the $G_5$ remnant samples is only one-half the sample density of the $L_4$ samples (which is the case in both the prior-art Burt Pyramid analyzer of FIG. 1 and the FSD analyzer of FIG. 1a, described above). However, as discussed above in connection with FIG. 1b, the sample density of the remnant $G_5$ need not be reduced with respect to that of $L_4$ (i.e., in this case, there is a need to accommodate two separate $G_5$ samples within each set of 32 successive samples). The fact that the 32nd sample period of each set of 32 successive samples is otherwise unoccupied, permits this 32nd sample period to be used to accmmodate the second $G_5$ sample in each set of 32 successive samples.

A feature of the sample format shown in FIG. 5a is that the temporal distribution of the $L_0, L_1, L_2, L_3, L_4$ and $G_5$ samples permits the samples of each set of 32 successive sample periods to be efficiently related temporally and/or spatially to the information they define and to the information defined in corresponding sets of unanalyzed samples of the information component defined by the sampled temporal input signal $G_0$ (not shown in FIG. 5a). However, while the sample distribution shown in the FIG. 5a format is desirable, it is not essential to the present invention.

It is apparent from FIG. 5a that at a $CL_1$ sample rate, it is not possible for the analyzer multiplexed stage to accommodate all of the $L_0$ samples in addition to the $L_1$, $L_2$, $L_3$, $L_4$ and $G_5$ samples (so that, at a $CL_1$ sample rate, it is necessary to provide the first analyzer stage, in addition to the multiplexed analyzer stage, in order to accommodate the $L_0$ samples). However, if one is willing to pay the price of doubling the sample rate to $2CL_1$, an analyzer comprised of a single multiplexed stage (shown in the embodiments of FIGS. 3 and 4) can be used to accommodate all of the $L_0, L_1, L_2, L_3, L_4$ and $G_5$ samples in a single serial stream output (as is shown in FIG. 5b). The fact that the sample period is doubled to $2CL_1$, permits the $L_0$ respective samples to occupy only half of the total number of all the sample periods (rather than occupying every one of all the sample periods, as is the case when the sample rate is only $CL_1$). By comparing the distribution formats of the respective analyzer multiplexed stage outputs of FIGS. 5a and 5b with one another, it is apparent that the respective distribution patterns of $L_0, L_1, L_2, L_3, L_4$ in FIG. 5b correspond to the respective distribution patterns of $L_1, L_2, L_3, L_4$ and $G_5$ of FIG. 5a. In the case of FIG. 5b, the $G_5$ samples occur in the 32nd, 96th, 160th . . . sample periods. Thus, in FIG. 5b, each set of samples is comprised of 64 sample periods (rather than only 32 sample periods as is the case in FIG. 5a). Thus, in FIG. 5b, the 64th sample period of each set of 64 successive sample periods will either be unoccupied or be occupied by a second $G_5$ remnant sample. In all other respects, the format of FIG. 5b is similar to that of FIG. 5a. More specifically, both the formats of FIGS. 5a and 5b relate to a one-dimensional information component, wherein the submultiple is equal to one half and M is equal to 5.

Figure 5C:
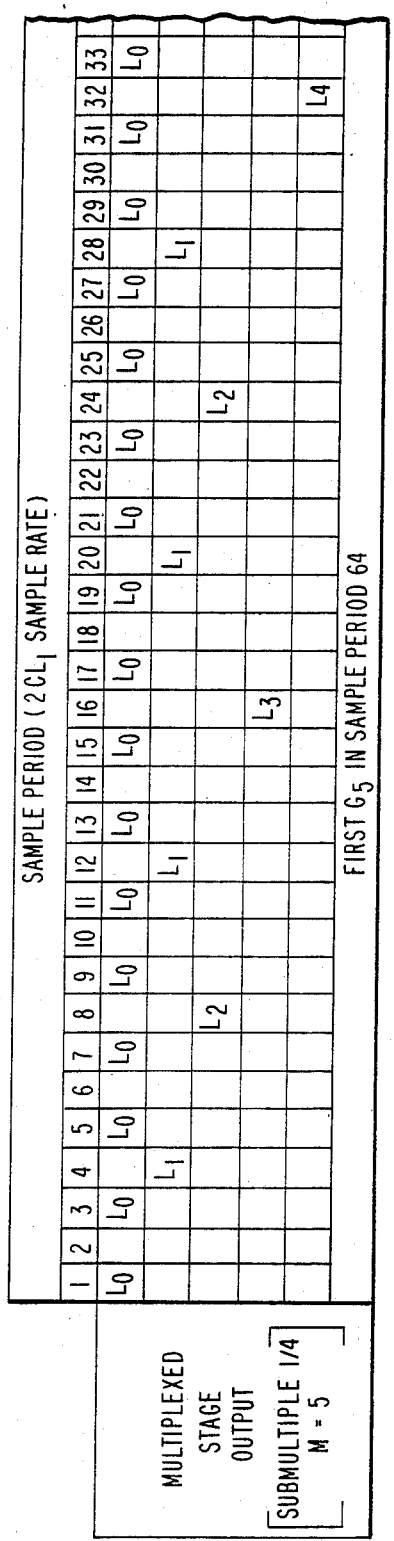
FIG. 5c is a timing diagram illustrating a second preferred format of time-multiplexed samples generated by the FIG. 3 or 4 embodiment of the present invention, which may be employed for an information component having two dimensions.

The format in FIG. 5c is similar to that in FIG. 5b in that M is assumed to be equal to 5 and in that the sample rate is assumed to be $2CL_1$ (i.e., the analyzer multiplexed stage is that of the FIGS. 3 or 4 embodiments). However, FIG. 5c is directed to the case of a two-dimensional information component (e.g., a scanned television image), wherein the submultiple has a value of one-fourth. In this case, the distribution pattern of the $L_0$ samples (which occupy each of the odd sample periods) in FIG. 5c remains the same as the distribution pattern of the $L_0$ samples in FIG. 5b. However, since the submultiple in FIG. 5c is one-quarter (rather than one-half as in FIG. 5b) the number of $L_1, L_2, L_3, L_4$ and $G_5$ samples, respectively, in FIG. 5c is only one-half the corresponding number of $L_1, L_2, L_3, L_4$ and $G_5$ samples in FIG. 5b. Specifically, in FIG. 5c, an $L_1$ sample occupies sample periods 4, 12, 20 . . . ; an $L_2$ sample occupies sample periods 8, 24, 40 . . . ; an $L_3$ sample occupies sample periods 16, 48, 80 . . . ; an $L_4$ sample occupies sample periods 32, 96, 160 . . . ; and a $G_5$ sample occupies sample periods 64, 192, 320 . . . . Thus, in FIG. 5c each set of samples is comprised of 128 successive sample periods.

Figure 5D:
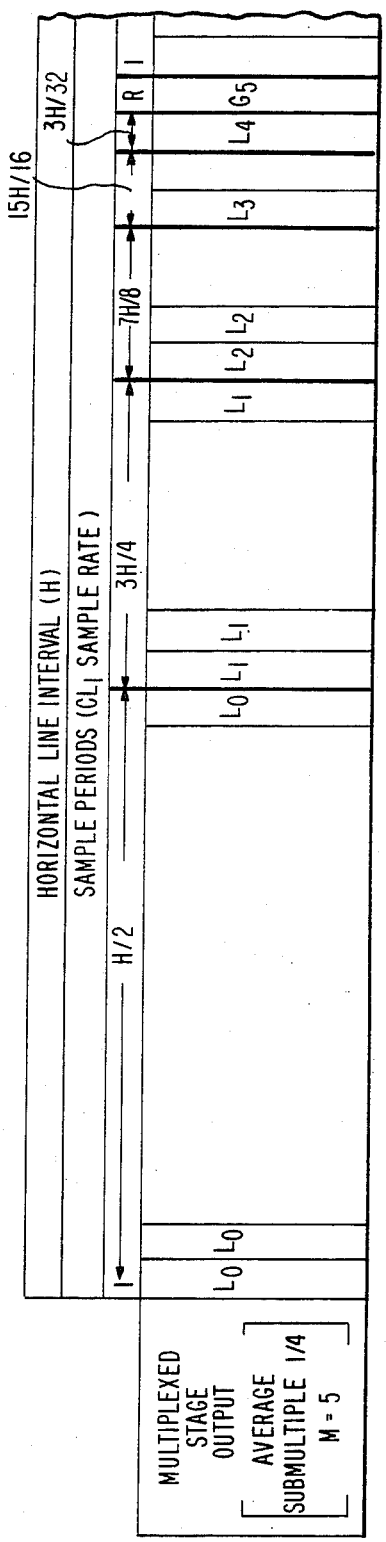
FIG. 5d is an alternative multiplexed sample format that may be substituted for the format shown in FIG. 5c.

The respective distribution pattern format of samples shown in each of FIGS. 5b and 5c retains the desirable feature, discussed above in connection with FIG. 5a, with respect to all of the analyzed samples of a set efficiently relating temporally and/or spatially to the same piece of information of the information component of the unanalyzed sampled temporal input to the analyzer. However, the present invention contemplates other less desirable sample distribution patterns, such as that shown in FIG. 5d, as well. FIG. 5d considers the type of decimation format of a horizontally-scanned, 2-D television image shown in aforesaid co-pending application Ser. No. 632,467. Specifically, in this decimation format, alternate pixel samples comprising each horizontal scan line of each pyramid stage are first decimated, after which alternate scan lines of pixel samples of that pyramid stage are decimated. The result is that it becomes possible to fit all the remaining pixel samples comprising each given one of the scan lines of all pyramid stages following any particular stage within the time interval of that decimated scan line which immediately follows each given one of the undecimated scan lines of that particular stage.

FIG. 5d represents the case of the FIG. 3 embodiment or the FIG. 4 embodiment (wherein the sample period is at a sample rate of $2CL_1$ and the multiplexed stage output is comprised of a serial stream including $L_0$, $L_1$ ... $L_4$ and $G_5$). Since there are as many $L_0$ samples in each horizontal scan line as there are $G_0$ samples in that scan line, it is assumed in FIG. 5d that each scan line of $G_0$ samples (which originally occur at a sample rate of $CL_1$) has been passed through a data compressor (having an input operating at a $CL_1$ sample rate and an output operating a $2CL_1$ sample rate), so that at the output of the data compressor all the $G_0$ samples of a given horizontal scan line are compressed into only the first half of that given horizontal scan line time interval. This allows all of the $L_1$, $L_2$ ... $L_4$ and $G_5$ samples to fit into the second half of that given horizontal scan line interval in the manner shown in the FIG. 5d format.

In the FIG. 2 embodiment, analyzer multiplexed stage 203X, at a $CL_1$ sample rate, operates on the already decimated $G_1$ output of the first stage. In this case there is no need for a data compressor, because the $L_1$ portion of the serial stream output corresponding to any given undecimated horizontal scan line interval can be fitted into that given undecimated horizontal scan line interval, while all of the $L_2$, $L_3$ ... $L_4$ and $G_5$ samples derived from that given undecimated horizontal scan line interval can be fitted into the decimated horizontal scan line interval that immediately follows that given undecimated horizontal scan line interval. Thus, in the case of the FIG. 2 embodiment, FIG. 5d must be modified to the extent that (1) a time interval equal to two successive horizontal scan line intervals would replace the single horizontal scan line interval shown in FIG. 5d (2) the two horizontal line intervals would be divided into to sub-intervals equal to H (occupied by $L_1$), H/2 (occupied by $L_2$), 3 H/4 (occupied by $L_3$), 7 H/8 (occupied by $L_4$), and the remainder of the decimated horizontal line interval R (occupied by the remnant $G_5$).

While the present invention covers the FIG. 5d sample format for the serial stream output from the analyzer multiplexed stage (as well as other possible unshown sample formats), the sample format of FIG. 5d is significantly less desirable than the preferred formats of FIGS. 5a, 5b and 5c. The reason for this is that in the preferred formats of FIGS. 5a, 5b and 5c, each set of analyzed samples $L_0$ ... $G_5$ that relate temporally and/or spatially to the same piece of information as do corresponding sets of $G_0$ samples, occupy the same relative temporal positions as one another. This is not the case in the sample format shown in FIG. 5d (where the first-occurring $L_1$ sample follows the last-occurring $L_0$ sample in an entire horizontal scan line, the first-occurring $L_2$ sample follows the last-occurring $L_1$ sample, etc.).

FIG. 6 is a block diagram of a preferred implementation of a Burt Pyramid configuration of an analyzer multiplexed stage of the FIG. 2 or 3 embodiments for operating in real time on a sampled digital signal defining a two-dimensional information component, such as a television video signal. The sampled temporal digital input $G_{INP}$ for the analyzer multiplexed stage shown in FIG. 6 corresponds either to $G_1$, in the case of the FIG. 2 embodiment of the present invention, or corresponds to $G_0$, in the case of the FIG. 3 embodiment. Further, the sample (pixel) clock frequency of the FIG. 6 analyzer multiplexed stage is $CL_1$ in the case of the FIG. 2 embodiment of the present invention and is $2CL_1$ in the case of the FIG. 3 embodiment. Otherwise, the structure shown in FIG. 6 is the same for both the FIG. 2 and FIG. 3 embodiments of the present invention.

The respective samples of the $G_{INP}$ serial stream and the serial stream from the output of decimator and data rate buffer 600 are interleaved by a 2 to 1 multiplexor (MUX) 602 into a single serial stream of samples, which is applied as an input to both horizontal convolution filter and decimator 604 and delay means 606. The delayed output serial stream of samples from delay means 606 is applied as a plus (+) input to subtractor 608.

Horizontal convolution filter and decimator 604 is preferably implemented in the manner shown in FIG. 7, operating in its a-alternative, described in detail below. In any event the stream of samples appearing at the output of horizontal convolution filter and decimator 604 are applied as an input to vertical convolution filter 610, which is conventional in function and structure. The serial stream of samples appearing at the output of vertical convolution filter 610 is applied both as an input to decimator and data rate buffer 600 and as a first input to 2 to 1 MUX line expander 612. Expander 612, which has a digital signal defining the value ZERO applied as a second input thereto, is operated by a line clock at the scan line frequency to interleave alternate scan lines of samples from the output of vertical convolution filter 610 with scan lines of ZERO-valued samples in the serial stream of samples derived at the output of expander 612. The output from expander 612, after interpolation by vertical interpolation filter 614, is applied as a first input to 2 to 1 MUX pixel expander 616. Expander 616, operating at the pixel clock frequency, interleaves each sample from interpolation filter 614 with a ZERO-valued sample applied to a second input to expander 616. The serial stream output from expander 616, after interpolation by horizontal interpolation filter 618, is applied to the minus (−) input to subtractor 608. The output sample stream from subtractor 608 is applied as a first input to 2 to 1 MUX 620. Decimator and data rate buffer 600 includes a memory for storing only the samples of the same alternate scan lines of samples at the output of vertical convolution filter 610 which are forwarded by expander 612 to the input of vertical interpolation filter 614. In this manner, buffer 600 operates as a vertical sample decimator. Further, by reading out the samples stored in the memory to the second input of MUX 602 at only one-half the rate at which the undecimated samples of the alternate scan lines are written into the memory of block 600, block 600 operates as a data rate buffer. Furthermore, each remnant sample $G_M$ stored in the memory of block 600 is read out at an appropriate time (discussed in more detail below) and applied as a second input to MUX 620. Further, as described in more detail below, the output serial stream from subtractor 608 is comprised of multiplexed samples $L_{INP}$ (i.e., $L_0$ or $L_1$, as the case may be), ... $L_{M-1}$. Therefore, the serial stream output from MUX gate 620 is comprised of $L_{INP}, \ldots G_M$ samples.

Figure 7:
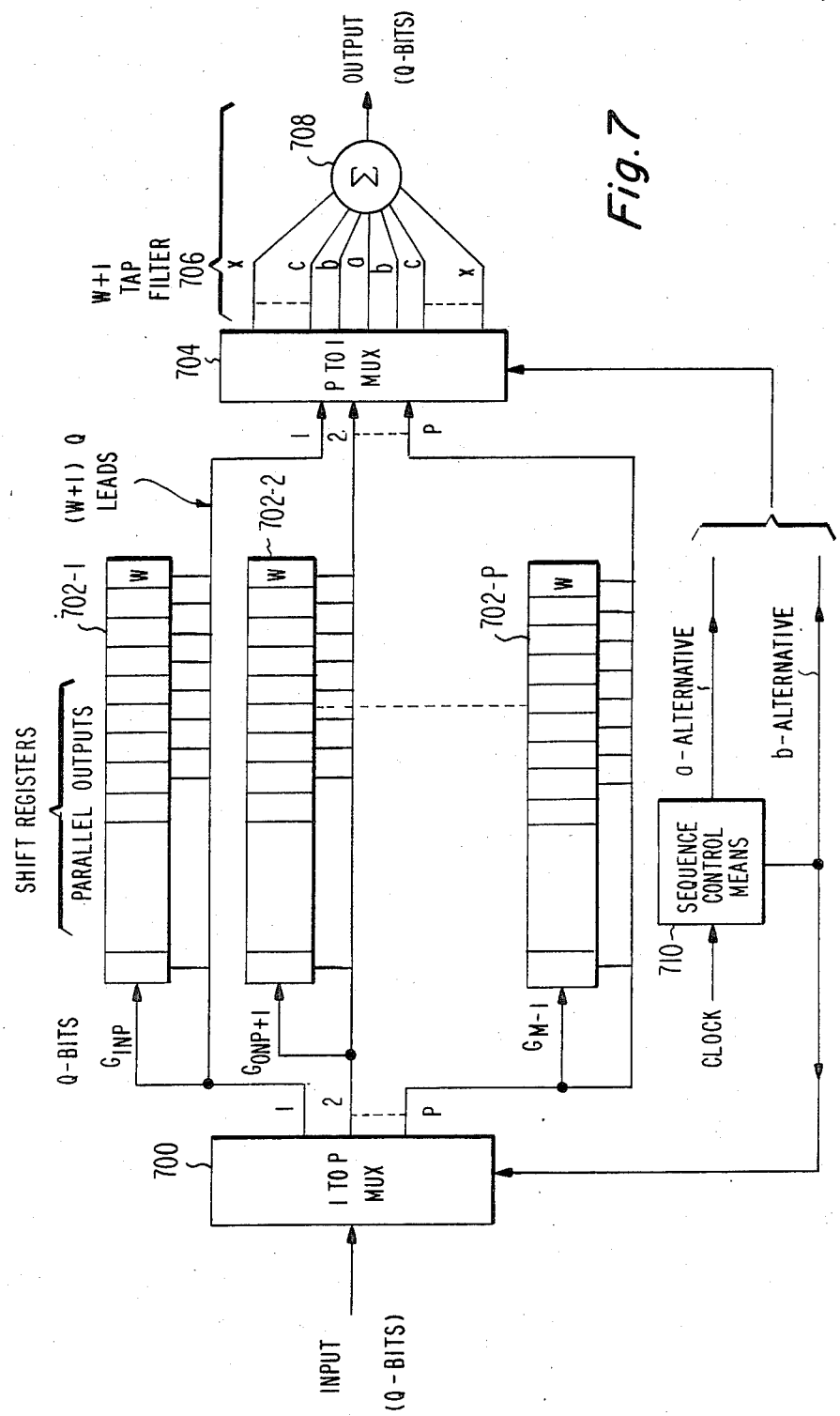
FIG. 7 is a block diagram of a filter structure which is capable of operating as either the horizontal convolution filter and decimator or the horizontal interpolation filter of FIG. 6.

Reference is made to FIG. 7, which performs the function of horizontal convolution filter and decimator 604 in its a-alternative and performs the function of horizontal interpolation filter 618 in its b-alternative. In FIG. 7, each sample is represented by a multibit binary number comprised of Q-bits. The filter shown in FIG. 7 is a W+1 tap output-weighted filter having a symmetrical kernel weighting function in which the respective values of the weighting factors are a, b, c ... x. $G_{INP}$ is $G_1$ and P has a value equal to M-1 in the case of the FIG. 2 embodiment, and $G_{INP}$ is $G_0$ and P has a value equal to M in the case of the FIG. 3 embodiment. The frequency of the clock in FIG. 7 is $CL_1$ in the case of the FIG. 2 embodiment, and is $2CL_1$ in the case of the FIG. 3 embodiment.

The structure of FIG. 7 is comprised of a 1 to P MUX 700, a group of W-stage shift registers 702-1 ... 702-P, P to 1 MUX 704, W+1 tap filter 706 (comprised of symmetrical kernel weighting function factors a, b, c ... x and summer 708) and sequence control means 710. Each of MUX 700 and 704 includes means responsive to a control signal, preferably in the form of the value of a multibit control code, input thereto for selectively coupling the input to MUX 700 to a certain one of its outputs 1 ... P or a certain one of inputs 1 ... P of MUX 704 to its output, in accordance with the value of the applied control code. Furthermore, there may be one or more other values of the applied control code which result in the input and output of MUX 700 or 704 being decoupled from one another.

Sequence control means 710, in response to clock signals applied thereto, generates respective sets of control codes on each of its two outputs. By way of example, sequence control means 710 may include a counter and associated gates for deriving each individual control code in each of the sets only in response to the counter registering one or more specified counts. Alternatively, each control code in a set can be derived from the output of a read-only-memory (ROM) having its input address derived from a counter output. In any event, sequence control means 710 derives a first set of control codes that are applied as a control input to MUX 700 and a second set of control codes that are applied as a control input to MUX 704, when MUX 704 is operating in its a-alternative. When operating in its b-alternative, the first set of control codes are applied as a control input to MUX 704.

As indicated in FIG. 7, each of respective outputs 1 ... P of MUX 700 is individually associated with each of shift registers 702-1 ... 702-P. Therefore, MUX 700, in accordance with the respective values of the control codes applied thereto, steers each sample of the serial stream input thereto to the input of its proper shift register. Further, each of the shift registers 702-1 ... 702-P is shifted at the same rate as the rate at which samples are applied to its input, so that all samples already stored in any one of shift registers 702-1 ... 702-P are shifted when a new sample is applied to the input of that shift register.

The current sample applied to the input of any one of shift register 702-1 ... 702-P, together with the respective samples stored in each of the W stages of that shift register, are applied as parallel outputs to its corresponding one of inputs 1 ... P of MUX 704. Since each sample is comprised of Q bits, it takes (W+1)Q leads to apply each of the parallel outputs from the respective shift registers 702-1 ... 702-P to its corresponding one of inputs 1 .. P of MUX 704.

In its b-alternative, sequence control means 710 applies the same control codes as an input to MUX 700 and MUX 704. Therefore, every time an input sample is steered by MUX 700 to the input of any one of shift register 702-1 ... 702-P, the parallel outputs from that one shift register are coupled through MUX 704 to the W+1 tap filter 706, thereby deriving a filtered output sample from summer 708. Thus, in the b-alternative no pixel decimation takes place, since each and every sample in the serial stream input to MUX 700 gives rise to a corresponding filtered sample in the serial stream output from filter summer 708.

However, in the a-alternative, sequence control means 710 supplies control codes to MUX 704 which do result in pixel sample decimation taking place. More specifically, only a first of each pair of two consecutive parallel outputs from shift register 702-1 applied to input 1 of MUX 704 are coupled by MUX 704 to filter 706. Thus, all of the inputs to MUX 704 are decoupled from filter 706 for the second of each pair of two consecutive parallel outputs from shift register 702-1 applied to input 1 of MUX 704, due to the fact that the values of the control code applied to MUX 704 at such times causes the output of MUX 704 to be decoupled from any of its inputs. MUX 704 is operated in a similar manner with respect to each of its inputs 2 ... P, so that only the first of each pair of two consecutive parallel outputs from each individual one of shift registers 702-2 ... 702-P is coupled to filter 706.

Thus, only half as many filtered samples appear in the serial stream output from summer 708 as are present in the serial stream input to MUX 700, thereby providing pixel sample decimation.

The operation of the Burt Pyramid configuration analyzer multiplexed stage of FIG. 6 (including horizontal filter apparatus of the type shown in FIG. 7) will now be described. For illustrative purposes, it is assumed that $G_{INP}$ is $G_0$, the pixel clock frequency is $2CL_1$, and that M is 5, and that it is desired to derive an output from the serial stream output from MUX 620 having the format shown in FIG. 5c. In this case, MUX 602 forwards successive $G_0$ samples as an input to filter and decimator 604 and delay means 606 only during each odd sample period 1, 3, 5 ... (shown in FIG. 5c). During each even sample period 2, 4, 6 ..., any sample then read out of decimator and data rate buffer 600 is forwarded through MUX 602 to the input of horizontal convolution filter and decimator 604 and the input of delay means 606. Initially, buffer 600 is assumed to be empty, so that only $G_0$ samples are applied by MUX 602 as an input to filter and decimator 604 and delay means 606. The filtered and decimated pixel samples of each successive scan line at the output of horizontal convolution filter and decimator 604 are filtered in the vertical direction and then applied as an input to both buffer 600 and line expander 612. Line expander 612 replaces the pixel samples of alternate lines with zero-valued samples. Therefore, the average sample density of non-zero-valued pixels at the output of line expander 612 is reduced to only one-fourth of the sample density of $G_0$. However, after passing through vertical interpolation filter 614, pixel expander 616 and horizontal interpolation filter 618, the sample density of the serial stream of samples applied to the minus (−) input of subtractor 608 from filter 618 has been increased by a factor of four so as to be equal to the sample density of $G_O$ applied to the plus (+) sign input of subtractor 608 from delay means 606. Therefore, the $L_0$ output samples from subtractor 608 occur only in odd sample periods (at a $2CL_1$ sample rate), as shown in FIG. 5c.

The filtered samples appearing at the output of vertical convolution filter 610 in response to $G_0$ samples applied to horizontal convolution filter and decimator 604, are $G_1$ samples. Decimator and data rate buffer 600 writes into storage only those $G_1$ samples at the output of vertical convolution filter 610 which correspond to the non-zero-valued samples at the output of expander 612, thereby operating as an effective vertical decimator. Thus, the sample density of the $G_1$ samples stored hn buffer 600 is only one-fourth of the sample density of $G_0$. At a $2CL_1$ sample rate, buffer 600 can be programmed to read out the $G_1$ samples in any preselected ones of the even-occurring sample periods (preferably, the $G_1$ samples are read out of buffer 600 during those sample periods occupied by the $L_1$ samples shown in FIG. 5c (i.e., sample periods 4, 12, 20, 28 . . . ).

During the next cycle of operation, MUX 602 interleaves the $G_0$ and the read out $G_1$ samples into a single serial stream and applies them as an input to horizontal convolution filter and decimator 604. The result is that, at the end of the second cycle, the serial stream output from subtractor 608 includes both $L_0$ and $L_1$ samples (preferably occurring during the sample periods occupied by the $L_0$ and $L_1$ samples in FIG. 5c). Further, the output from vertical convolution filter 610 now includes both $G_1$ and $G_2$ samples. The second-cycle vertically-decimated $G_1$ samples written into storage by buffer 600 replace the first-cycle of $G_1$ samples in storage and, in addition, vertically-decimated $G_2$ samples are stored. The stored $G_2$ samples are reduced in sample density by one-quarter with respect to the stored $G_1$ samples. In the third cycle of operation, the stored $G_2$ samples are preferably read out during the sample periods occupied by the $L_2$ samples in FIG. 5c (i.e., sample periods 8, 24, 40 . . .). The analyzer multiplexed stage shown in FIG. 6 operates in a substantially similar manner during each additional cycle to read out through MUX 602 respective $G_3$ a samples and $G_4$ samples preferably at the respective sample periods occupied by the $L_3$ and $L_4$ samples in FIG. 5c. That is, the $G_3$ samples are read out of storage in sample period 16, 48, 80 . . . and the $G_4$ samples are read out of storage in sample periods 32, 96, 160 . . . . Thus, in the fifth cycle, and in every operating cycle thereafter, the single serial stream of samples from MUX 602 includes $G_0$, $G_1$, $G_2$, $G_3$ and $G_4$ samples preferably occuping respectively the same sample periods as are occupied by the corresponding $L_0$, $L_1$, $L_2$, $L_3$ and $L_4$ samples shown in FIG. 5c.

During the fifth and each following cycle of the analyzer multiplexed stage shown in FIG. 6, vertical convolution filter 610 preferably derives a $G_5$ sample in each sample period occupied by an $L_4$ sample shown in FIG. 5c. If the FIG. 6 analyzer multiplexed stage is to be functionally equivalent to the FIG. 1 embodiment, only alternate $G_5$ samples of the input to buffer 600 are written into storage. On the other hand, if the FIG. 6 analyzer multiplexed stage is to be functionally equivalent to the FIG. 1b embodiment, each and every $G_5$ sample at the input to buffer 600 is written into storage. Later the stored $G_5$ samples are read out from buffer 600 on its $G_M$ output and applied to MUX 620. Assuming the FIG. 5c format, in the functionally-equivalent FIG. 1 embodiment, the $G_5$ samples read out of buffer 600 on the $G_M$ output thereof occur in the 64, 192, 320 . . . sample periods. On the other hand, in the functionally-equivalent 1b embodiment, the $G_5$ samples read out on the $G_M$ output of buffer 600 occur in the 64, 128, 192, 256 320 . . . sample periods.

FIG. 8 illustrates an FSD pyramid configuration analyzer mutiplex stage that is functionally equivalent to the FIG. 1a embodiment. In FIG. 8, elements 802, 806, 808, 810 and 820 are structurally and functionally equivalent to the corresponding elements 602, 606, 608, 610 and 620 of FIG. 6. Horizontal convolution filter 804 of FIG. 8 differs from horizontal convolution filter and decimator 604 of FIG. 6 by employing the b-alternative in FIG. 7, rather than the a-alternative of FIG. 7 structure. Decimator and data rate buffer 800 of FIG. 8 differs from decimator and data rate buffer 600 of FIG. 6 only in the programming of its decimator operation. Specifically, decimator and data rate buffer 800 writes into storage only alternate pixel samples of alternative scan lines applied as an input thereto from the output of vertical convolution filter 810. Thus, decimator and data rate buffer 800 operates as both a horizontal decimator and a vertical decimator. However, in the case of FIG. 6, the horizontal decimation takes place in horizontal convolution filter and decimator 604. Therefore, in this case, decimator and data rate buffer 600 writes into storage all of the pixel samples of alternate scan lines applied as an input thereto from the output of vertical convolution filter 610, thereby operating as a vertical decimator only. However, it should be understood that it is possible to implement the Burt Pyramid configuration of FIG. 6 employing the b-alternative of FIG. 7 (rather than the a-alternative) by operating decimator and data rate buffer 600 to provide both horizontal and vertical decimation, as in FIG. 8. Further, because no decimation takes place in horizontal convolution filter 804 of the FSD pyramid configuration of FIG. 8, the output from vertical convolution filter 810 can be applied directly to the minus (−) input of subtractor 808. Thus, the FSD pyramid configuration does away with the need and expense of hardware corresponding to line expander 612, vertical interpolation filter 614, pixel expander 616 and horizontal interpolation filter 618 required by the Burt Pyramid configuration of FIG. 6.

Other than these structural differences, the operation of the FSD pyramid configuration of FIG. 8 is similar in all material respects to that of the Burt Pyramid configuration of FIG. 6, described in detail above.

In the Burt Pyramid configuration of FIG. 6, when $G_{INP}$ is $G_0$, the clock employed by horizontal convolution filter and decimator 604 (comprised of the a-alternative of FIG. 7) has a frequency of $2CL_1$. It is desirable, wherever possible, to employ a lower frequency clock. In the FIG. 4 embodiment of the present invention, discussed above, this is accomplished by employing a horizontal convolution filter and decimator 604 having a polyphase structure (such as that shown in either FIGS. 9a or 9b), rather than the a-alternative of FIG. 7 structure.

Figure 9A:
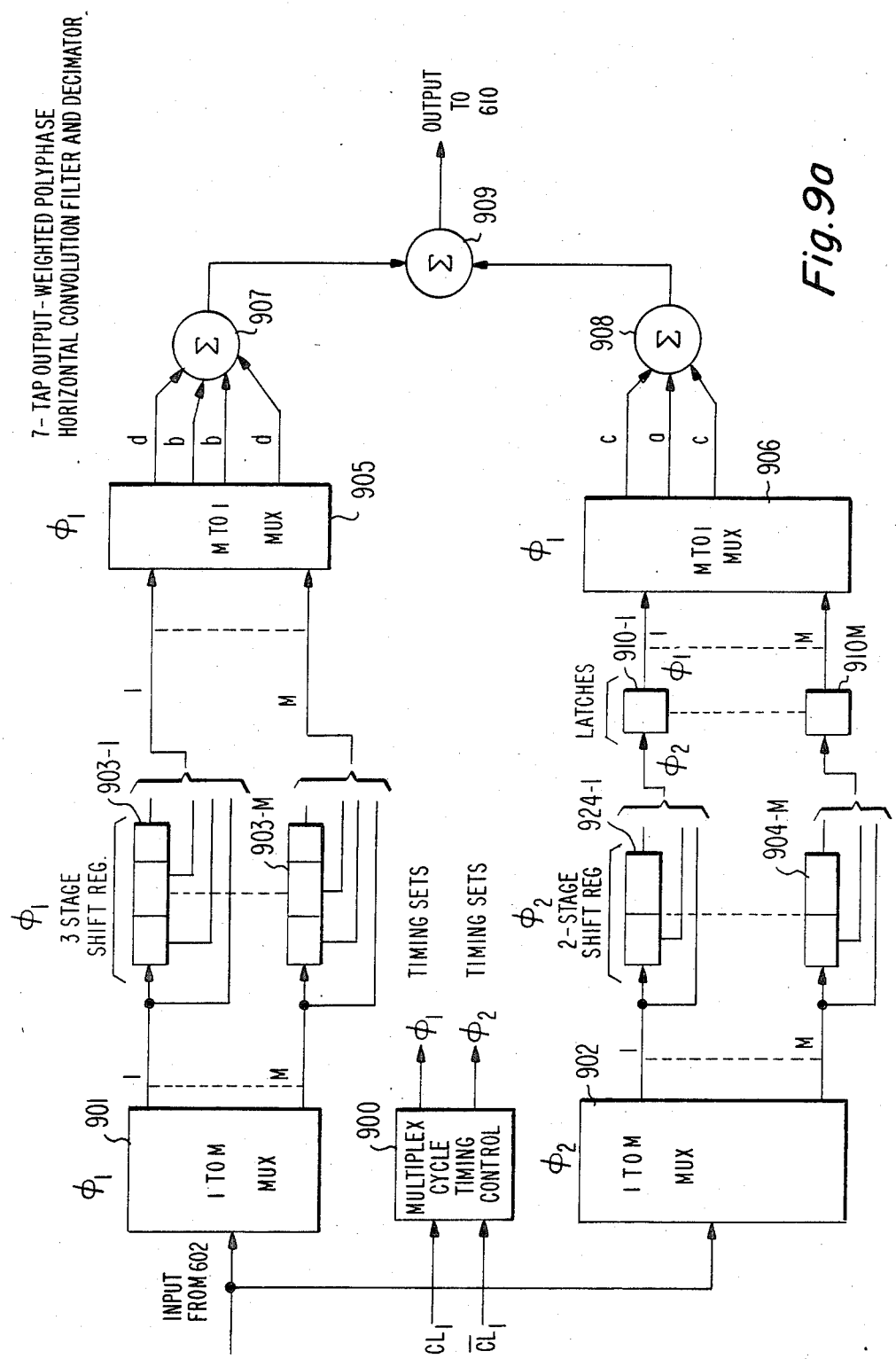
FIGS. 9a and 9b, respectively, illustrate first and second embodiments of the horizontal convolution filter/decimator of the multiplexed stage of FIG. 4 operating as a Burt Pyramid analyzer, which embodiments employ polyphase filter decimators.

Referring to FIG. 9a, there is shown an output-weighted species of a polyphase horizontal convolution filter and decimator that may be employed in the FIG. 4 embodiment of the present invention. For illustrative purposes, this polyphase filter is assumed to be a seven-tap filter. The FIG. 9a structure is comprised of multiplex cycle timing control 900, 1 to M MUX 901, 1 to M MUX 902, a group of three-stage shift registers 903-1 . . . 903-M, a group of two-stage shift registers 904-1 . . . 904-M, M to 1 MUX 905, M to 1 MUX 906, summer ($\Sigma$) 907, summer 908, summer 909, and a group of latches 910-1 . . . 910-M.

Multiplex cycle timing control 900 is responsive to a clock input having a frequency $CL_1$. Optionally an inverted clock, $\overline{CL}_1$, may also be applied as an input to multiplex cycle timing control means 900 (as indicated in FIG. 9a), or, alternatively, the inverted clock may be generated internally in control means 900 from the $CL_1$ clock input thereto. In any case, control means 900 derives as a first output phase $\Phi_1$ timing sets that occur at the $CL_1$ sampling rate in phase with the $CL_1$ clock, and as a second output phase $\Phi_2$ timing sets of control codes that occur at the $CL_1$ sampling rate in phase with the inverted clocks. As indicated in FIG. 9a MUX 901, shift registers 903-1 . . . 903-M, MUX 905, and MUX 906 are operationally controlled by the $\Phi_1$ timing sets from control means 900, while MUX 902 and shift registers 904-1 . . . 904-M are operationally controlled by the $\Phi_2$ timing sets. The inputs to latches 910-1 . . . 910-M are nally controlled by the $\Phi_2$ timing sets control codes, while the outputs of latches 910-1 . . . 910-M are operationally controlled by the $\Phi_1$ timing sets of control codes.

The single stream of samples from MUX 602 are applied as an input to both MUX 901 and MUX 902. As described in connection with FIG. 6, this single stream of samples occurs at a $2CL_1$ sample rate and is comprised of multiplexed $G_0 \ldots G_{M-1}$ samples (preferably formatted in the manner shown in FIG. 5c). Other than in their phase, the sequential order of occurrence of the control odes of the $\Phi_1$ timing sets is identical to the sequential order of occurrence of the control codes of the $\Phi_2$ timing sets. The result is that each odd $G_0$ sample applied to the input to both MUX 901 and 902 is steered by only MUX 901 to the 1 output thereof, while each even $G_0$ sample applied to the input to both MUX 901 and MUX 902 is steered by only MUX 902 to the 1 output thereof. In a similar manner, each odd $G_1 \ldots G_{M-1}$ sample of the input to MUX 901 and MUX 902 is steered respectively only to the appropriate one of the 2 . . . M outputs of only MUX 901, while each even $G_1 \ldots G_{M-1}$ sample to the input to MUX 901 and MUX 902 is steered respectively only to the appropriate one of the 2 . . . M outputs of MUX 902. Each sample appearing respectively at the 1 . . . M outputs of MUX 901 is applied as an input to the corresponding one of three-stage shift registers 903-1. While each sample appearing respectively at the 1 . . . M outputs of MUX 902 is applied as an input to the corresponding one of two-stage shift registers 904-1 . . . 904-M.

The seven-tap filter is comprised of a symmetrical kernel weighting function in which the seven weighting factors, arranged in order, are d, c, b, a, b, c and d. The seven-tap polyphase filter is comprised of separate four-tap and three-tap partial filters. Specifically, as indicated in FIG. 9a, the four-tap partial filter is comprised of weighting factors d, b, b, d, together with summer 907, while the three-tap partial filters is comprised of weighting factors c, a, c, together with summer 908. MUX 905, in accordance with the $\Phi_1$ time sets control codes, steers the appropriate one of the respective outputs of each of shift registers 903-1 . . . 903-M to the four-tap partial filter. As indicated in FIG. 9a, the respective outputs of each of three-stage shift registers 903-1 . . . 903-M consist of four samples made up of the three samples stored in the respective stages of each shift register together with the current sample applied to its input. In the four-tap partial filter, the four respective samples that are forwarded to the four-tap partial filter through MUX 905 are respectively multiplied by the four weighting factors d, b, b, d and then summed by summer 907. The output from summer 907 provides the output from the four-tap partial filter. The output from summer 907 is applied as a first input to summer 909.

In a similar manner to the operation of MUX 901 and shift registers 903-1 . . . 903-M, MUX 902 and shift registers 904-1 . . . 904-M provide three-sample outputs from each of shift registers 904-1 . . . 904-M. The respective outputs of each of shift registers 904-1 . . . 904-M are applied to the corresponding input 1 . . . M of MUX 906 through a corresponding one of latches 910-1 . . . 910-M. In FIG. 9a, latches 910-1 are required to convert the phase $\Phi_2$ timing of the samples from respective shift registers 904-1 . . . 904-M to phase $\Phi_1$ timing at the corresponding respective inputs 1 . . . M of MUX 906. MUX 906, in accordance with phase $\Phi_1$ timing sets of control codes, steers the appropriate one of the respective three sample outputs applied to each of inputs 1 . . . M of MUX 906 to the input to the 3-tap partial filter. These three samples are respectively multiplied by the c, a, and c weighting factors and then summed by summer 908 to provide an output from the three-tap partial filter. The output from summer 908 is applied as a second input to summer 909. The respective samples applied to the first input and the second input of summer 909 both occur at the phase $\Phi_1$ timing, so that corresponding output samples from the first and second partial filters occur isochronously. Therefore, summer 909 produces a single output stream of samples to vertical convolution filter 610, in which the value of each sample is the sum of the respective values of the corresponding samples from the first and second partial filters applied respectively to the first and second inputs of summer 909.

In order to perform their function of connecting phase $\Phi_2$ timing to phase $\Phi_1$ timing, the latches need not necessarily be positioned between the shift registers and the M to 1 MUX of the second partial filter (as is shown in FIG. 9a). Instead, the latches can be positioned beyond the M to 1 MUX and before the summer of the second partial filter (thereby reducing the number of latches required by a factor of M). In this latter case, the M to 1 MUX is controlled by phase $\Phi_2$ timing sets of control codes.

Since the sample rate of the input sample stream from MUX 602 is $2CL_1$ and the sample rate of the output sample stream to vertical convolution filter 610 from summer 909 is only $CL_1$, the polyphase filter arrangement of FIG. 9a provides decimation by one half in the pixel sample density in the horizontal dimension.

Figure 9B:
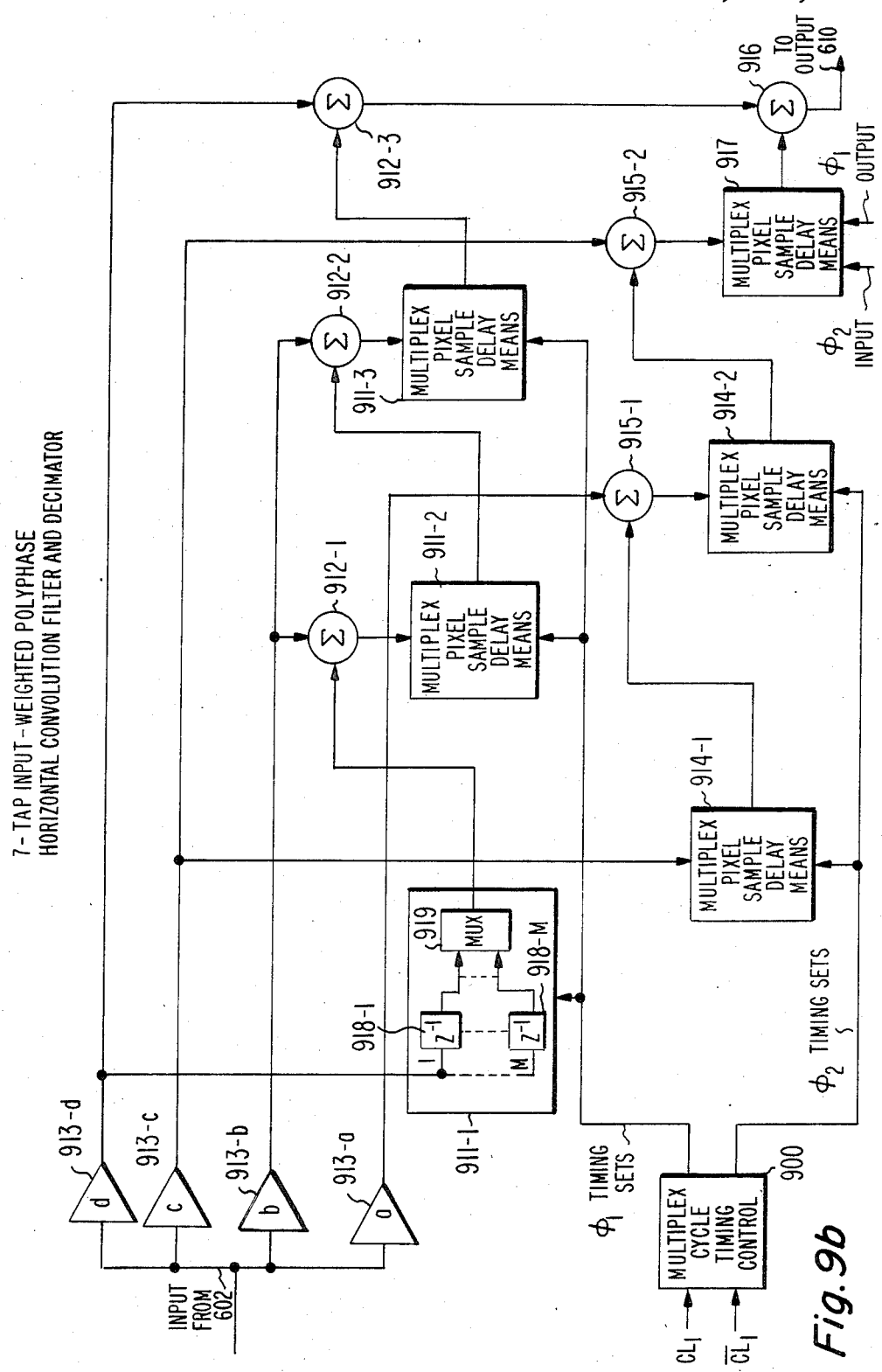

An alternative to the seven-tap output-weighted polyphase horizontal and convolution filter and decimator shown in FIG. 9a, is the seven-tap input-weighted polyphase horizontal convolution filter and decimator shown in FIG. 9b. FIG. 9b employs a multiplex cycle timing control identical to that employed in FIG. 9a.

However, in FIG. 9b the elements associated in the first partial filter in FIG. 9a (i.e., MUX 901, shift registers 903-1 . . . 903-M, MUX 905, d and b weighting factors and summer 907) are replaced in FIG. 9b by the three multiplex pixel sample delay means 911-1, 911-2 and 911-3 together with summers 912-1, 912-2 and 912-3. The first partial filter is still associated with the d and b weighting factors. Specifically, the input from MUX 602 is applied through the d weighting factor multiplier 913-d as an input to multiplex pixel sample delay means 911-1 and also as a first input to summer 912-3. The input from MUX 602 is applied through b weighting factor multiplier 913-b as a first input to summer 912-1 and also as a first input to summer 912-2. The output of multiplex pixel sample delay means 911-1 is applied as a second input to summer 912-1 and the output of summer 912-1 is applied as an input to multiplex pixel sample delay means 911-2. The output from multiplex pixel sample delay means 911-2 is applied as a second input to summer 912-2 and the output from summer 912-2 is applied as an input to multiplex pixel sample delay means 911-3. The output from multiplex pixel sample delay means 911-3 is applied as a second input to summer 912-3 and the output from summer 912-3 represents the output from the first partial filter.

The second partial filter, associated with weighting factors c and a, is comprised of multiplex pixel sample delay means 914-1 and 914-2 together with summers 915-1 and 915-2. Specifically, input 602 is applied through c weighting factor multiplier 913-c as an input to multiplex pixel sample delay means 914-1 and as a first input to summer 915-2. The input from MUX 602 is applied through a weighting factor multiplier 913-a as a first input to summer 915-1. The output from multiplex pixel sample delay means 914-1 is applied as a second input to summer 915-1 and the output from summer 915-1 is applied as an input to multiplex pixel sample delay means 914-2. The output from multiplex pixel sample delay means 914-2 is applied as a second input to summer 915-2, and the output from summer 915-2 represents the output from the second partial filter.

Respective outputs of the first and second partial filters are combined in FIG. 9b by applying the first partial filter output from summer 912-3 as a first input to summer 916 and applying the second partial filter output from summer 915-2 as an input to multiplex pixel sample delay means 917 and applying the output of multiplex pixel sample delay means 917 as a second input to summer 916. The serial stream sample output to convolution filter 610 appears at the output of summer 916.

As indicated in FIG. 9b, each of multiplex pixel sample delay means 911-1, 911-2, 911-3, 914-1, 914-2 and 917 is comprised of a group of one-pixel delay elements (schematically denoted $Z^{-1}$) 918-1 . . . 918-M and an M to 1 MUX 919.

In the case of multiplex pixel sample delay means 911-1, 911-2 and 911-3 of the first partial filter, the $\Phi_1$ timing sets control codes selectively control the enabling of both the input and the output of each pixel sample delay element 918-1 . . . 918-M. Further, in this case, MUX 919 is operated in accordance with the $\Phi_1$ timing sets control codes to steer the respective outputs of the pixel sample delay elements 918-1 . . . 918-M through the corresponding one of MUX inputs 1 . . . M to the output of multiplex pixel sample delay means 911-1, 911-2 and 911-3. Except for the fact that they are selectively controlled by the $\Phi_2$ timing sets of control codes (rather than by the $\Phi_1$ timing sets of control codes), the operation of multiplex pixel sample delay means 914-1 and 914-2 of the second partial filter is identical to that of multiplex pixel sample delay means 911-1, 911-2 and 911-3 of the first partial filter. However, in the case of multiplex pixel sample delay means 917, the $\Phi_2$ timing sets control codes selectively control the enabling of the input to each of the pixel sampling delay elements 918-1 . . . 918-M thereof, while the $\Phi_1$ timing sets control codes selectively control the enabling of the output of each of pixel sampling elements 918-1 . . . 918-M and the operation of the MUX 919 thereof. Thus, corresponding samples from the first and second partial filters applied respectively to the first and second inputs of summer 916 occur isochronously to provide a filtered output sample having a value equal to the sum of the respective values of the first and second partial filter samples then being applied to the first and second inputs thereof.

The input-weighted polyphase filter and decimator of FIG. 9b, like the output-weighted polyphase filter and decimator, derives its output serial stream of samples to vertical convolution filter 610 at a $CL_1$ sample rate, in response to an input serial stream of samples from MUX 602 having a sample rate of $2CL_1$. Therefore, by employing the polyphase filter and decimator of FIGS. 9a or 9b as the horizontal convolution filter and decimator of FIG. 6, to provide a $CL_1$ sample rate serial stream output therefrom, it becomes possible to operate vertical convolution filter 610, the write input of buffer 600, line expander 612, and vertical interpolation filter 614 at a clock having a frequency of only $CL_1$ (rather than $2CL_1$). However, even in this case, in the implementation shown in FIG. 6, it is still necessary to operate pixel expander 616, horizontal interpolation filter 618, the read output of decimator and data rate buffer 600, MUX 602, delay means 606, and subtractor 608 and MUX 620 with a clock having a frequency of $2CL_1$. The reason for this is that it is necessary to double the pixel sample density in the horizontal dimension in pixel expander 616. However, by substituting polyphase vertical and horizontal interpolation filters for the corresponding interpolation filter of FIG. 6, the use of a $CL_1$ clock frequency can be extended to the vertical polyphase interpolation filter and to most of the horizontal polyphase interpolation filter. However, a conversion to a $2CL_1$ clock is required for interleaving corresponding output samples from the first and second partial filters of the horizontal polyphase interpolation filter.

Referring to FIG. 10, there is shown structure for implementing the synthesizer multiplexed stage (228-X, 328-X or 428-X) of any of the FIGS. 1, 2 or 3 embodiments of the present invention. In FIG. 10, $L'_{INP}$ and $G'_{INP}$, respectively, correspond to $L'_1$ and $G'_1$ in the case of the FIG. 2 embodiment of the present invention, and correspond to $L'_0$ and $G'_0$ in the case of either the FIG. 3 or the FIG. 4 embodiment of the present invention.

The input to the synthesizer multiplexed stage is a serial stream of samples comprised of $L'_{INP}$ . . . $G'_M$. For illustrative purposes, it is assumed that the distribution format of the respective $L'_{INP}$ . . . $G'_M$ samples in the serial stream input to the FIG. 10 synthesizer multiplex stage is that shown in FIG. 5c.

The structure of FIG. 10 is comprised of 2 to 1 MUX line expander 1000 (operating at the scan line clock frequency), vertical interpolation filter 1002, 2 to 1 MUX pixel expander 1004 (operating at the pixel clock frequency), horizontal interpolation filter 1006 (which may be structurally implemented by the b-alternative of FIG. 7) 2 to 1 MUX 1008 (which operates to insert a zero-valued sample in the sample period occupied by each $G_M$ sample), adder 1010, 1 to 2 MUX 1012, and data rate buffer 1014. A MUX 1012 steers odd input samples to its $G'_0$ output and steers even samples to the write input of buffer 1014.

Assume that a $G'_M$ ($G_5$ in FIG. 5c) sample of the input serial stream is being applied to the first input of adder 1010. In this case, MUX 1008 applies a zero-valued sample to the second input of adder 1010 during this $G'_M$ sample period. Therefore, adder 1010 of the output sample derived by adder 1010 remains $G'_M$. This output sample from adder 1010 is steered through MUX 1012 to the write input of data rate buffer 1014. Data rate buffer 1014 reads out the stored $G'_M$ sample in a sample period assigned to a $G'_{M-1}$ sample ($L_4$ sample period in FIG. 5c). Then, this readout $G'_M$ sample after circulation through line expander 1000, vertical interpolation filter 1002, pixel expander 1004, horizontal interpolation filter 1006, and MUX 1008, is applied to the second input of adder 1010 isochronously with the application of the $L'_{M-1}$ sample to the first input of adder 1010. This time the output sample from adder 1010 is a $G'_{M-1}$ sample. In general, the read out of data rate buffer 1014 is programmed so that the sample period occupied by the readout $G_K$ sample circulated through elements 1000, 1002, 1004, 1006 and 1008 always occupies the same sample period as the $L'_{K-1}$ sample (where K has any value between 1 and K). This ensures that both the $G_K$ and $L_{K-1}$ samples will be isochronously applied to the first and second inputs of adder 1010 so that the output from adder 1010 in every case is $G'_{K-1}$. However, since each $L'_0$ sample occupies an odd sample period (and hence each $G'_1$ sample read out of data rate buffer 1014 also occupies an odd sample period), each $G'_O$ sample appearing at the output of adder 1010 also occupies an odd sample period. Therefore, MUX 1012 steers each $G'_O$ sample to its $G'_{INP}$ output, rather than steering it to the write input of data rate buffer 1014.

The purpose of line expander 1000, vertical interpolation filter 1002, pixel expander 1004 and horizontal interpolation filter 1006 is to double the sample density of each of the vertical and horizontal dimensions of each of the respective $G'_M \ldots G'_1$ samples circulating there through. Therefore, the relative sample density at the second input to adder 1010 of any one of samples $G'_M \ldots G'_1$ is four times greater than that of its corresponding sample density at the output from data rate buffer 1014.

What is claimed is:

1. A time-synchroniuzed system for converting in delayed real time a first sample temporal signal into a second sampled temporal signal, wherein the samples comprising said first signal define an n-dimensional information component, where n is a given integer of at least one, and the samples comprising said second signal define each of a given plural number of separate frequency subs-pectra of the frequency spectrum of said n-dimensional information component, in which (1) each of the sub-spectra below that of the highest-frequency sub-spectrum has a sample density which is a certain sub-multiple of the sample density of its next-higher-frequency subspectrum, and (2) the respective samples of each of said sub-spectra occur temporally at a sample rate which is directly proportional to its sample density; said system comprising an anlyzer multiplexed stage including:

sampled-signal processing means having at least one input and at least one output, said processing mean exhibiting predetermined processing characteristics;
   multiplexing means for selectively applying said first signal to said one input of said processing means in accordance with each of a given set of time-synchronized control signals serially applied to said multiplexing means; and
   means for repetitively generating ssaid given set of control signals and serially applying them to said multiplexing means;
   wherein said predetermined processing characteristics exhibited by said processing means are such as to derive said signal as an output of said multiplexed stage after a number of repetitive generations of said set of control signals that is a linear function of said given plural number of sub-spectra;
   wherein said processing means comprises means forming a first part of a closed loop and including a data rate buffer for writing into storage, in said buffer, decimated samples of each of respective sample groups that have been decimated in each of said n dimensions, each of said sample group having a separate one of said sub-spectra corresponding thereto, thereby resulting in stored decimated samples of all said sample groups in said buffer;
   wherein said multiplexing means includes first means forming a second part of said closed loop for reading out as buffer output from said buffer the stored decimated samples of all said sample groups but the sample group corresponding to a lowest-frequency one of the sub-spectra, with said readout samples of said respective sample groups in said buffer output being arranged in a predetermined temporal order format that has been determined in accordance with each of the repetitive sets of control signals, and a 2 to 1 multiplexor (MUX) forming a third part of said closed loop and having said first signal applied as a first input thereto and said buffer output applied as a second input thereto for combining in a certain temporal order respective samples of said first signal and said buffer output into a first single serial stream output of samples, said first single serial stream output of sample from said MUX being applied to said one input of said processing means;
   wherein said means including said buffer further comprises convolution filter means for filtering said first single serial stream of samples applied to said one input of said processing means in each of said n dimensions to provide a second single serial stream of convolution filtered samples that are applied to said data rate buffer for use in the writing into storage of said decimated samples of said respective sample groups into storage;
   wherein said means including said buffer provides said decimation in each of said n dimensions at at least one point thereof situated between said one input of said processing means; and
   wherein said decimated samples of said respective sample groups are written into storage in said buffer.

2. The system defined in claim 1, wherein:
   said multiplexing means further includes second means for deriving, as an independent second readout output of said buffer, the sample group of stored decimated samples corresponding to said lowest-frequency one of said sub-spectra during the occurence of preselected sample periods with respect to said predetermined temporal order format; and said processing means further comprises means for further processing said convolution filtered samples to provide further processed filtered samples, and means for combined said further processed filtered samples with said sample group of readout samples of said second readout output to provide a third signal serial stream of samples as the output from said processing means, said output from said processing means constituting said second signal.

3. The system defined in claim 2, wherein said multiplexed stage is a Burt Pyramid multiplexed stage, and wherein:

said means for further processing said filtered samples includes (1) subtraction means, (2) expander/interpolation filter means responsive to said convolution filtered samples for increasing the sample density of each of respective sample groups of convolution filtered samples in each of said n dimensions back to it sample density prior to its decimation, thereby to provide a fourth single serial stream of interpolated samples that are applied to a minus (−) input of said subtraction means, and (3) delay means for applying the first single serial stream output of samples from said MUX to a plus (+) input of said subtraction means with corresponding samples applied to the plus (+) and minus (−) inputs of said subtraction means occurring in time coincidence with one another, whereby the output from said subtraction means, which comprises said further processed filtered samples, is a fifth single stream of samples that defines all of said sub-spectra but the lowest-frequency one of said sub-spectra.

4. The system defined in claim 3, wherein said means including said buffer provides decimation in a first of said n dimensions at a point situated within said convolution filter means.

5. The system defined in claim 4, wherein: said convolution filter means includes a polyphase filter/decimator for providing said decimation in said first of said n dimension.

6. The system defined in claim 5, wherein said polyphase filter/decimator is an output-weighted polyphase filter/decimator.

7. The system defined in claim 5, wherein said polyphase filter/decimator is an input-weighted polyphase filter/decimator.

8. The system defined in claim 3, wherein said means including said buffer provides decimation in at least a first of said n dimensions at a point situated beyond convolution filter means.

9. The system defined in claim 8, wherein said means including said buffer provides decimation in all of said n dimensions at a point situated beyond said convolution means.

10. The system defined in claim 2, wherein said multiplexed stage is an FSD Pyramid multiplexed stage, and wherein:

said means including said buffer provides decimation in all of said n dimensions at a point situated beyond said convolution means, said means for further processing said convolution filtered sample includes (1) subtraction means, (2) means for directly applying said single stream of convolution filtered samples to a minus (−) input of said subtraction means, and (3) delay mean for applying the first single serial stream output of samples from said MUX to a plus (+) input of said subtraction means with corresponding samples applied to the plus (+) and minus (−) inputs of said subtraction means occurring in time coincidence with one another, whereby the output from said subtraction means, which comprises said further processed filtered samples, is a fourth single stream of samples that defines all of said sub-spectra but the lowest frequency one of said sub-spectra.

11. The system defined in claim 1 wherein said certain sub-multiple is $1/2^n$.

12. The system defined in claim 11, wherein said system further includes:

a first analyzer stage responsive to an applied original sampled temporal signal that defines an n-dimensional information having a frequency spectrum that exceeds the frequency spectrum of said first signal, the sampling density of said first signal being $2^n$ of the sample density of said original signal;

said first analyzer stage analyzing the frequency spectrum of said original sampled temporal signal into a single frequency subspectrum that exceeds the highest-frequency sub-spectrum of said first signal and into said first signal, said single frequency subspectrum having the same sample density as that of said original signal, and the respective samples of said original sampled temporal signal and said single subspectrum thereof each occurring temporally as a serial stream of samples at a sample rate which is directly proportional to their sample density.

13. The system defined in claim 12, wherein:

said original sample temporal signal is a video signal defining an information component comprised of a horizontally and vertically scanned two-dimensional spatial image.

14. The system defined in claim 11, wherein:

said first signal is a video signal defining an information component comprised of a horizontally and vertically scanned two-dimensional spatial image.

15. A time-synchronized system for converting in delayed real time a first sampled temporal signal into a second sampled temporal signal, wherein the samples comprising said second signal define an n-dimensional information component, where n is a given integer of at least one, and the samples comprising said first signal define each of a given plural number of separate frequency sub-spectra below that of the highest-frequency sub-multiple of the sample density of its next-higher-frequency subspectrum, and (2) the respective samples of each of said sub-spectra occur temporally at a sample rate which is directly proprotional to it sample density; said system comprising a synthesizer multiplexed stage including:

sampled-signal processing means having at least one input and at least one output, said processing means exhibiting predetermined processing characteristics;

multiplexing means for selectively applying said first signal to said one input of said processing means in accordance with each of a given set of time-synchronized control signals serially applied to said multiplexing means; and means for repetitively generating said given set of control signals and serially applying them to said multiplexing means;

wherein said predetermined processing characteristics exhibited by said processing means are such as to derive said second signal as an output of said multiplexed stage after a number of repetive generations of said set of control signals that is a liner function of given plural number of sub-spectra;

wherein said first signal is comprised of a single serial stream of sub-spectra samples with the samples of said respective sub-spectra being arranged in a first predetermined temporal order format that corresponds with each of the repetitive sets of control signals, whereby each sample of the lowest-frequency sub-spectrum occurs in a known ordinal one of the sample periods of said first signal;

wherein said processing means is comprised of means including a data rate buffer and expander/interpolaion filter means, said buffer receiving a first serial stream of samples from said one input of said processing means for storage therein and for applying a second serial stream of stored samples as an input to said expander/interpolation filter means;

wherein said multiplexing means includes an adder for deriving as an adder output a third serial stream of samples comprised of samples of said first serial stream mixed with samples of said second signal, a 1 to 2 multiplexor (MUX) for separating said third serial stream of samples into said first serial stream of samples and said second signal and for applying said first serial stream of samples to said one input of said processing means, means for applying said first signal as a first input to said adder, a 2 to 1 MUX for applying a zero-valued sample to a second input of said adder only during each sample period occupied by a first-signal sample of the lowest-frequency sub-spectrum and for applying the output of said expander/interpolation filter means as a second input to said adder during all other sample period of said first signal, whereby samples of said both said third and first serial streams are arranged in respective groups that correspond with the first predetermined temporal order format of the respective sub-spectra samples of said first signal, and means for operating said buffer to read out said second serial stream of stored samples in a second predetermined temporal order format wherein samples of each individual group in said second serial stream occupy sample periods that corresponds to those sample periods that are occupied by its immediately next higher-frequency sub-spectrum samples of said first signal; and wherein said expander/interpolation filter means increased the sample density of each group of said second serial stream by a multiple which is equal to the reciprocal of said certain sub-multiple.

16. The synthesizer multiplexed stage defined in claim 15, wherein:

said certain sub-multiple is $1/2^n$.

17. The synthesizer multiplexed stage defined in claim 16, wherein:

said first predetermined format arrangement of said first signal temporal order of sub-spectra samples is such that, when said 1 to 2 MUX is operated to separate relatively odd-occurring samples of said third serial stream from relatively even-occurring samples of said third serial stream, said third serial stream samples are properly separated into said first serial stream samples and said second-signal samples.

* * * * *

UNITED STATES PATENT AND TRADEMARK OFFICE
CERTIFICATE OF CORRECTION

PATENT NO. : 4,709,394

DATED : Nov. 24, 1987

INVENTOR(S): Roger F. Bessler; James H. Arbeiter; Joseph O. Sinniger

It is certified that error appears in the above-identified patent and that said Letters Patent is hereby corrected as shown below:

Col. 1, line 48, change "recuces" to --reduces--

Col. 13, line 21, change "hn" to --in--

Col. 13, line 49, after "$G_3$" delete --a--

Col. 15, line 39, change "odes" to --codes--

Claim 1, line 55, change "sample" to --sampled--

Claim 1, line 61, change "subs-pectra" to --sub-spectra--

Claim 1, col. 20, line 1, change "anlyzer" to --analyzer--

Claim 1, col. 20, line 12, change "ssaid" to --said--

Claim 1, col. 20, line 17, before "signal" insert --second--

Claim 1, col. 20, line 47, change "sample" to --samples--

Claim 2, col. 21, line 10, change "combined" to --combining--

Claim 15, line 59, change "it" to --its--

Col. 23, line 9, change "repetive" to --repetitive--

Col. 23, line 10, change "liner" to --linear--

Col. 23, line 11, before "given" insert --said--

UNITED STATES PATENT AND TRADEMARK OFFICE
CERTIFICATE OF CORRECTION

PATENT NO. : 4,709,394

DATED : Nov. 24, 1987

INVENTOR(S) : Roger F. Bessler; James H. Arbeiter; Joseph O. Sinniger

It is certified that error appears in the above-identified patent and that said Letters Patent is hereby corrected as shown below:

Col. 24, line 5, change "period" to --periods--

Col. 24, line 15, change "corresponds" to --correspond--

Signed and Sealed this

Nineteenth Day of April, 1988

Attest:

DONALD J. QUIGG

Attesting Officer

Commissioner of Patents and Trademarks